United States Patent [19]
Kubota

[11] Patent Number: 5,361,472
[45] Date of Patent: Nov. 8, 1994

[54] NC COMPLEX AUTOMATIC LATHE

[75] Inventor: Minoru Kubota, Narashino, Japan

[73] Assignee: Seiko Seiki Kabushiki Kaisha, Japan

[21] Appl. No.: 763,210

[22] Filed: Sep. 20, 1991

[30] Foreign Application Priority Data

Sep. 21, 1990 [JP] Japan .................................. 2-253719
Oct. 1, 1990 [JP] Japan .................................. 2-263512
Oct. 30, 1990 [JP] Japan .................................. 2-265383

[51] Int. Cl.⁵ .......................... B23B 7/04; B23B 7/06
[52] U.S. Cl. ........................... 29/37 A; 82/118; 82/120; 82/129
[58] Field of Search ................. 82/118, 119, 120, 129, 82/146; 29/27 C, 36, 37 R, 37 A, 39, 40

[56] References Cited

U.S. PATENT DOCUMENTS 3,978,745 9/1976 Okamoto ........................ 82/118

FOREIGN PATENT DOCUMENTS 0226836 7/1987 European Pat. Off. .
0371450 6/1990 European Pat. Off. .
1337281 8/1963 France .
2061096 6/1971 Germany .
2365768 4/1976 Germany .
0030401 1/1990 Japan ...................... 82/120

Primary Examiner—Z. R. Bilinsky
Attorney, Agent, or Firm—Bruce L. Adams; Van C. Wilks

[57] ABSTRACT

The NC complex automatic lathe is provided with a main spindle receptive therein a workpiece for chucking the same such as to protrude a front end portion of the workpiece, and a main spindle base for supporting the main spindle rotatably around a center axis and displaceably in a lengthwise direction of the workpiece. A turret type tool slide is disposed in the vicinity of the front end portion of the workpiece. The turret type tool slide is displaced transversely toward the center of the workpiece. A plurality of tool slide members are arranged radially around the front end portion of the workpiece in a free space away from the moving area of the turret type tool slide such as to undergo displacements toward the center of the workpiece.

14 Claims, 17 Drawing Sheets

NC COMPLEX AUTOMATIC LATHE

BACKGROUND OF THE INVENTION

The present invention relates firstly to NC complex automatic lathes for carrying out machining using a plurality of tools.

The present invention relates secondly to NC complex automatic lathes for carrying out front machining of a workpiece (hereinafter, referred to as "main machining") and rear machining thereof using a plurality of tools.

The present invention relates thirdly to NC automatic lathes constructed such that a plurality of tool slide members having bits around a workpiece are driven by a servo motor to undergo respective displacements to effect cutting operation of the workpiece.

Conventionally, from the first point of view, there are two types of NC automatic lathes provided with a plurality of radially arranged tool slide members (hereinafter, referred to as collectively "comb type tool slide"), or a turret type tool slide. The Comb type tool slide is designed such that a plurality of tools are disposed around a workpiece and one or more of them is selectively displaced with respect to a rotating workpiece to effect machining thereof. This type of tool slide has good machining accuracy since it does not need indexing rotation for selection of tools. Normally, a bit piece is attached as a tool for suitably effecting accurate machining such as finishing work.

On the other hand, the turret type tool slide is constructed such that one tool is selected from a plurality of tools attached to indexed positions, and the indexing rotation is carried out to place the selected one in a given working position to thereby displace the selected tool to effect machining of a workpiece. This type of tool slide is advantageous in that a multiple number of tools can be mounted to carry out secondary machining such as drilling work by a rotary tool, e.g., drill-endmill, and grinding work.

With regard to the automatic lathe provided with a comb type tool slide, since there is no need to carry out indexing rotation for selecting a tool as described before, such type of the lathe has advantages such as short cycle time for selections of tools and good cutting accuracy. However, it has drawbacks such as deficiency of tools due to its limited number of available tools and limited kinds of possible machining modes.

On the other hand, the automatic lathe provided with a turret type tool slide features that a multiple number of tools can be mounted. However, there are various drawbacks such as bad machining accuracy and long selecting time of tools due to indexing rotation for selection of tools, as compared to the comb type tool slide.

Conventionally, from the second point of view, the NC complex automatic lathe carries out the main and rear machinings of a workpiece by various methods, for example, as shown in FIGS. 10A and 10B. Namely, according to the first method shown in FIG. 10A, a main spindle base 81 rotates a main spindle which chucks a workpiece, while the main spindle base 81 slides in a direction Z1. When carrying out the main machining, a pair of tool slides 82 and 83 which constitute a comb type tool slide are driven to slide in directions X1 and X2, respectively. On the other hand, when carrying out the rear machining, immediately before cutting off the workpiece chucked to the main spindle a back-main spindle base 84 moves to a direction Z2 to receive the workpiece in a back-main spindle. Then, the back-main spindle base 84 moves transversely in a direction X3, so that the workpiece is subjected to the rear machining by a fixed tool slide 85 which is provided with a tool for use in the rear machining.

According to the second method shown in FIG. 10B, there is provided a main spindle base 91 driven in a manner similar to the FIG. 10A case. When effecting the main machining, a pair of turret tool slides 92, 93 are driven in direction X1 and X2, respectively. On the other hand, when effecting the rear machining, in manner similar to the first case, a back-main spindle base 94 is driven in a direction Z2 toward the main spindle base 91 such that a back-main spindle receives the workpiece. In this position, the rear or back machining is carried out by a rear machining tool which is attached to either of the turret tool slides 92 and 93.

However, in the first conventional method, since the main machining is carried out solely by the comb type tool slide, there are caused drawbacks such as deficiency of tools due to a limited number thereof and relatively small freedom of the machining, although the first method has some merits such as relatively short cycle time of tool selection and relatively good cutting accuracy.

With regard to the second conventional method, while a pair of turret tool slides are utilized to increase the number of tools, there are caused drawbacks such as relatively long tool selection time and relatively bad tool setting accuracy because of indexing rotation for tool selection, as compared to the comb type tool slide.

Particularly when carrying out the rear machining such as rear drilling of a workpiece chucked to the back-main shaft by means of the turret tool slide, there would be caused the drawback of degradation of machining accuracy such as center deviation in drilling and correction failure of bit, due to indexing error of the turret and positional error of tools attached to the turret tool slide.

Conventionally, from the third point of view, there are known several methods for cutting a workpiece by driving a plurality of tool slides in the NC automatic lathe. According to a first method as shown in FIG. 18, a signal servo motor M is utilized to drive each of five tool slide members 101a–101e. Namely, one of the tool slide members 101a–101e is selected together with one of the corresponding cylinders 102a–102e, and the selected cylinder and the corresponding tool slide member are driven by the servo motor M through a corresponding one of the corresponding cylinders 102a–102e, and the selected clyinder and the corresponding tool slide member are driven by the servo motor M through a corresponding one of levers 103a–103e.

On the other hand, according to a second method as shown in FIG. 19, three servo motors M1, M2 and M3 are utilized to drive five tool slide members 105a–105e. Namely, the first servo motor M1 is adapted to drive directly only the tool slide member 105e. The second servo motor M2 is adapted to alternatively drive the tool slide members 5c and 5d back and forth through a lever 106. The third servo motor M3 is adapted to alternatively displace a pair of tool slide members 5a and 5b disposed on a common slider 107 in opposed relation to each other with respect to a workpiece ω. By such construction, three tool slides are selectively driven so that three bits can concurrently contact with the workpiece ω to carry out concurrent cutting.

However, in the first method mentioned above, as shown in FIG. 18, one tool slide member is selectively driven among the tool slide members 101a–101e, thereby causing the drawback that concurrent cutting work could not be effected by simultaneously driving a plurality of tool slide members 101a–101e to operate a plurality of bits.

On the other hand, in the second method, as shown in FIG. 19, the three servo motors M1, M2 and M3 can be operated to drive, for example, each of the tool slide members 105a–105e in directions indicated by the arrows to carry out concurrent cutting work by the selected three tool slide members 105a, 105d and 105e. However, the pair of tool slide members 105a and 105b are fixed on the common slider 107 opposite sides with respect to the workpiece ω. The opposite tool slide members 105a and 105b are alternatively advanced to the workpiece ω by back and forth displacement of the slider 107. Therefore, the pair of bite of the opposite tool slide members could not carry our concurrent cutting work, i.e., perfect balance cutting work. In addition, the increased number of the servo motors may disadvantageously boost a production cost of the lathe.

SUMMARY OF THE INVENTION

Therefore, a first object of the present invention is to provide a complex automatic lathe which is not limited with respect to an available number of tools and which is suitable even for finishing work.

A second object of the present invention is to provide an NC complex automatic lathe having great machining freedom and good accuracy of rear machining, and being suitable for highly accurate finish treatment.

A third object of the present invention is to provide an NC automatic lathe effective to carry out concurrent cutting work under the perfect balance condition without increasing a number of servo motors.

According to the first aspect of invention, in the NC automatic lathe provided with a main spindle receptive of a workpiece therein for chucking the same as to protrude a front end portion of the workpiece, and a main spindle base for supporting the main spindle rotatably around a center of the workpiece and displaceably in a lengthwise direction of the workpiece, the lathe is characterizingly provided with a turret type tool slide disposed in the vicinity of the front end portion of the workpiece to undergo displacement toward the center of the workpiece, turret displacing means for displacing the turret type tool slide toward the center of the workpiece, and a plurality of tool slide members disposed around the front end portion of the workpiece radially with respect to one another in a free space other than a moving area or zone of the turret type tool slide to undergo displacements toward the center of the workpiece.

In the above described construction, the turret type tool slide is provided in the vicinity of the workpiece front end portion for mounting thereon a multiple number of tools such as to undergo displacement transversely to the workpiece center. Further, a plurality of tool slide members having good machining accuracy are provided radially around the workpiece front end portion in a free space other than a displacement area of the turret type tool slide such as to undergo respective transverse displacements toward the workpiece. By such construction, for example, the turret type tool slide is operated to carry out rough machining, and then the plurality of tool slide members are operated in the free space other than the moving area of the turret type tool slide to carry out finishing work. Further, the turret type tool slide and the plurality of tool slide members can be driven independently from one another to carry out concurrent machining of rough cutting and finish working. Moreover, the turret type tool slide can be attached with a rotary tool such as a drill and an end mill other than a regular bit for effecting secondary machining such as planar cutting or transverse drilling.

According to the second aspect of the invention, the lathe is comprised of a main spindle receptive of a workpiece for chucking the same such as to protrude a front end portion of the workpiece, main spindle base including means for rotating the main spindle around its axis, a group of tool slide members (or collectively a comb type tool slide) disposed at one side of the workpiece front end portion and being arranged radially to undergo displacements toward a center of the workpiece, a multi-tool slide disposed at another side of the workpiece front end portion in opposed relation to the comb type tool slide, multi-tool displacing means for displacing the multi-tool slide toward the workpiece center in a direction orthogonal to the axis of the main spindle, a back-main spindle for chucking the workpiece front end portion from a reverse direction with respect to the main spindle, and a back-spindle base for supporting the back-main spindle.

The inventive NC complex automatic lathe may further include means for displacing the back-main spindle base along a plane perpendicular to the axis of the main spindle in a direction intersecting a displacement direction of the multi-tool slide, and numerical control means for controlling the displacement of the multi-tool slide and the back-main splindle base.

Further, according to the second aspect of the invention, the NC complex automatic lathe is characterized in that the multi-tool slide is comprised of a turret type tool slide.

In the invention construction according to the second aspect of the invention, there are provided a main spindle and a back-main spindle. A comb type tool slide having good machining accuracy is provided at one side of a workpiece front end portion which is to be machined, while a multi-tool slide receptive of multiple tools is disposed at another side of the workpiece front end portion in opposed relation to the comb type tool slide. Accordingly, the comb type tool slide is used to effect finish machining, and the multi-tool slide is driven to carry out various kinds of works such as rough grinding, internal grinding, transverse drilling, rear drilling and rear grinding, thereby increasing machining freedom.

In the preferred form, besides the above noted operation, the displacement direction of the back-main spindle base is set to intersect with the displacement direction of the multi-tool slide driven by means of the multi-tool displacement means along a plane perpendicular to the axis of the main spindle. Further, the numerical control means controls the displacement of the multi-tool slide and the back-main spindle base so that a positional error of a tool relative to the multi-tool slide can be corrected such as to register a position of a tool tip on the multi-tool slide with a machining spot of the workpiece.

Further, preferably the NC complex automatic lathe is specifically designed such that the multi-tool slide is comprised of a turret type tool slide. Therefore, besides the above noted operations, even if there is an index error of the turret or a positional error of a tool attached to the turret type tool slide, these errors can be corrected by registering a position of the tool tip of the turret type tool slide with a working spot of the workpiece. Particularly, when carrying out a drilling operation at a rear center of a workpiece chucked by the back-main spindle using a rear drilling tool attached to the turret tool slide, center deviation and center height difference can be corrected to thereby ensure an accurate center alignment of the workpiece.

According to the third aspect of the invention the NC automatic lathe having a plurality of tool slide members attached with bits and disposed around a workpiece and having a servo motor for driving the tool slide members to undergo displacements to cut the workpiece, characterizingly each tool slide member is arranged such that its bit can displace toward a center of the workpiece, and at least a pair of tool slide members are selectively arranged at opposite sides of the workpiece such that the opposite tool slide members can independently from each other or cooperatively and concurrently with each other displace toward the center of the workpiece.

Further, according to one modification of the NC automatic lathe, characterizingly one of the oppositely arranged tool slide members is driven by a first serve motor, while the other of the opposite tool slide members is driven by a second servo motor.

Moreover, according to another modification, the NC automatic lathe characterizingly includes a link mechanism for linking one of the opposite tool slide members to a further tool slide member other than the other of the opposite tool slide member regulating means for regulating tool slide members which displace in the same direction by the link mechanism so as to provisionally advance to the center of the workpiece independently from each other, and tool slide selecting means for retracting the advanced tool slide member after it reaches a given position.

According to the above described third aspect of the invention, each tool slide member is arranged such that a bit thereof can displace to the center of the workpiece, and at least a pair of tool slide members are disposed at opposite sides of the workpiece. These opposed tool slide members can displace independently of each other or cooperatively and concurrently with each other to the center of the workpiece. Accordingly, bits of the two opposed tool slide members can contact concurrently with the workpiece to effect concurrent cutting work. In this case, the two bits advance to the workpiece from the opposite directions such that cutting resistances received by the two bits can cancel with each other to ensure perfectly balanced cutting work.

Further, according to the modification of the NC automatic lathe, one of the oppositely arranged tool slide members is driven by the first servo motor, while the other tool slide member is driven by the second servo motor. Therefore, the perfectly balanced cutting work can be effected in a manner as described above. Further, the pair of tool slide members can be driven by the two servo motors independently from each other. Therefore, the perfectly balanced cutting work can be carried out more accurately by regulating their displacement amounts, i.e., advancing amounts. Moreover in this modification the pair of bits can be sequentially applied to the workpiece while maintaining the settings of the corresponding tool slide members to effect sequential cutting or rough machining and finish working etc.

Furthermore according to the other modification of the invention, the regulating means is operated so selectively and independently precede, toward the center of the workpiece, the set of tool slide members which are coupled by the link mechanism to displace in the same direction. The preceded tool slide member is retracted when the same has reached a desired displacement position. Therefore, for example, among the tool slide members linked together to displace in the same direction, a rough cutting bit and a finishing bit are attached to a particular pair of the tool slide members, respectively. Then, the regulating means is operated to precede the one tool slide member which holds the rough cutting bits relative to the other tool slide member which holds the finishing bit by a given finishing margin. Further, the tool slide selecting means is set with a given position data in the form of the finishing margin for determining a retracting point of the preceded tool slide member. By such settings, the rough cutting bit firstly carries out rough cutting. When the rough cutting bit reaches the given position determined by the finishing margin, the associated tool slide member is retracted by the tool slide selecting means. Then, the finishing bit comes in contact with the workpiece to effect finishing work. Therefore, a signal servo motor is efficiently utilized to effect sequential machining of the rough cutting an finish working.

In the above description, a pair of tool slide members are adapted to displace in the same direction by the link mechanism. Alternatively, three or more of the tool slide members may be adapted to displace in the same direction. Even in such case, the regulating means is operated to sequentially advance a first tool slide member and then to retract the advanced tool slide member and then to retract the advanced tool slide member when the same has reached a given position, thereby enable sequential cutting by three or more of bits.

DETAILED DESCRIPTION OF THE INVENTION

Figure 5:
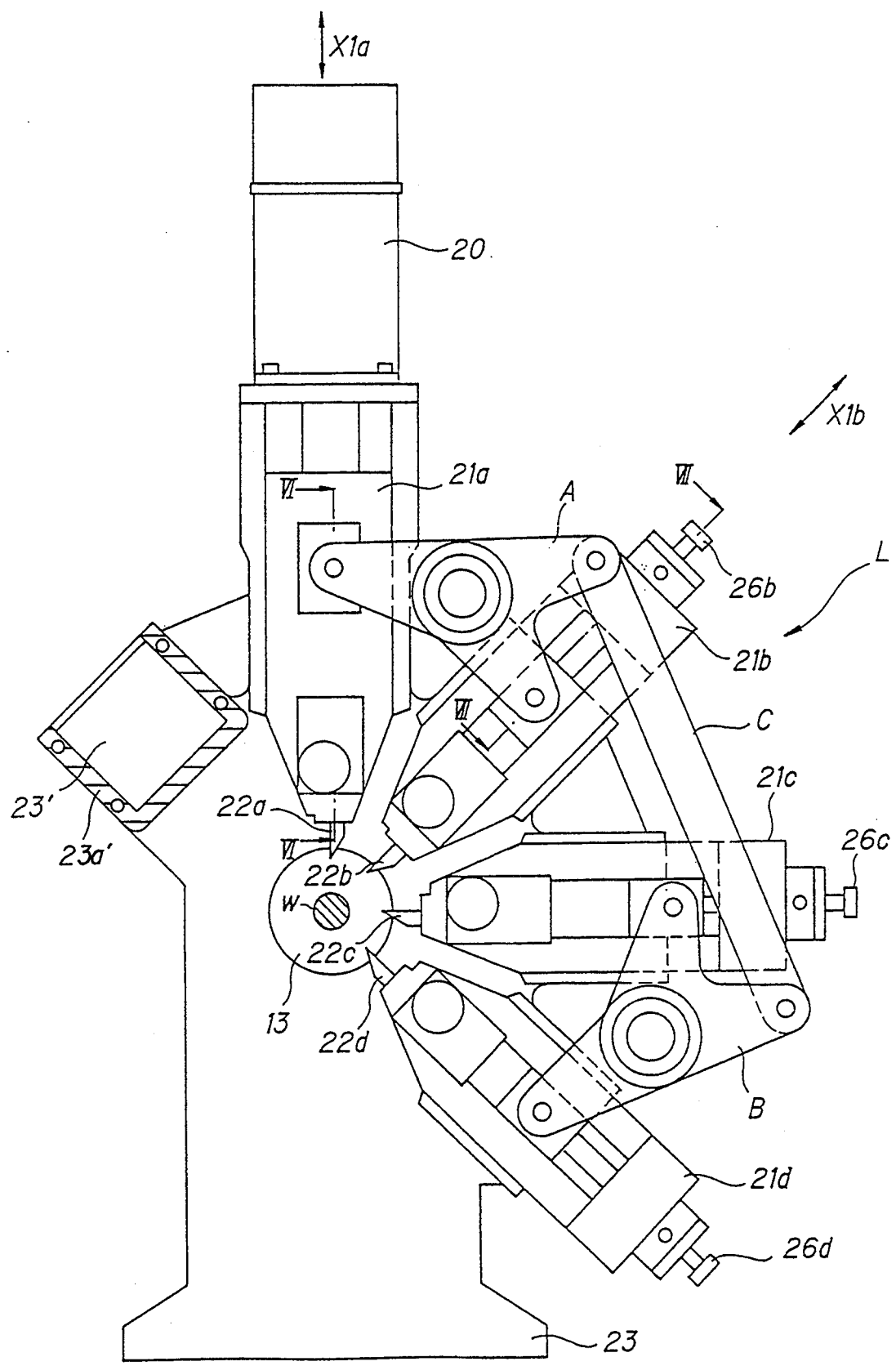
FIG. 5 is an enlarged side view of a comb type tool slide provided in the FIG. 1 embodiment.
Figure 6:
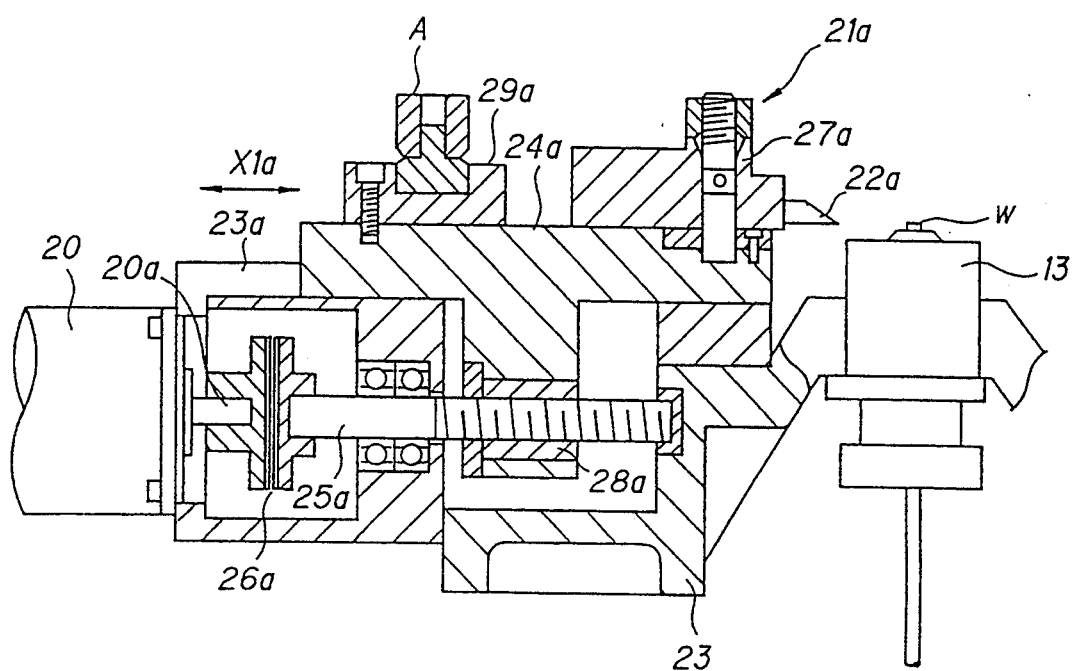
FIG. 6 is a partially sectional view of one tool slide member of the FIG. 5 slide, taken along the line VI—VI of FIG. 5.
Figure 7:
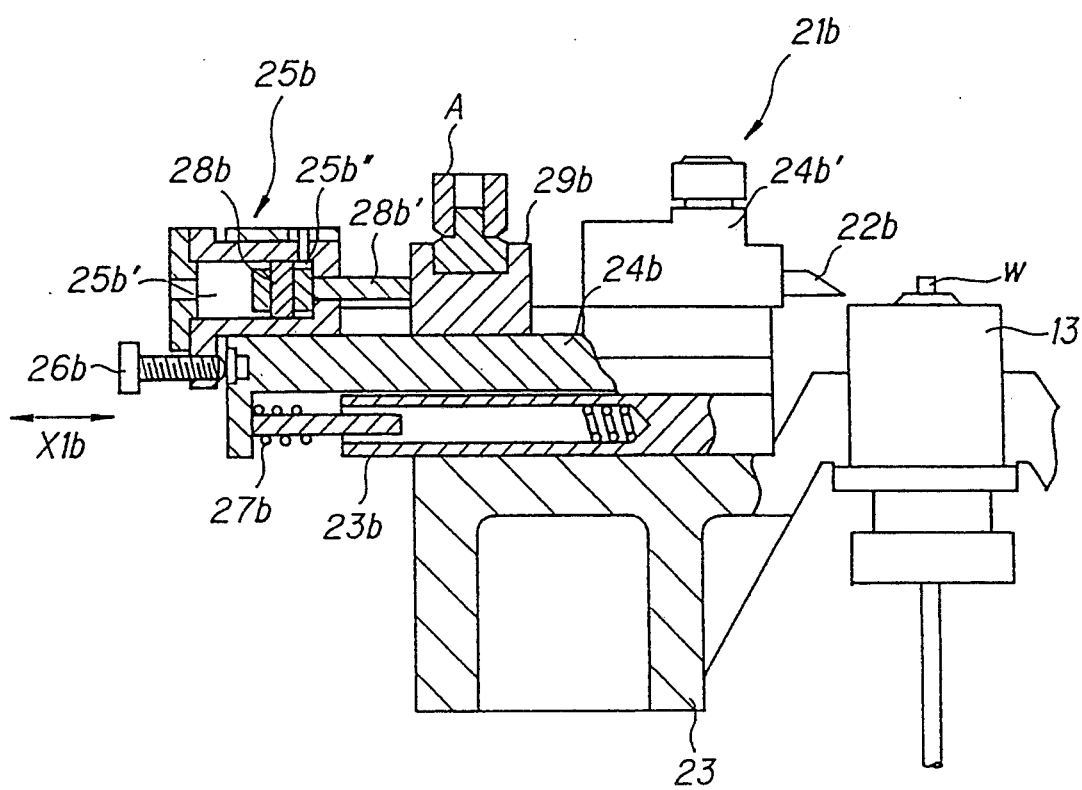
FIG. 7 is a partially sectional view of another tool slide member of the FIG. 5 slide, taken along the line VII—VII of FIG. 5.

Hereinafter, preferred embodiments of the NC complex automatic lathe applied with the present invention will be described in conjunction with the drawings. In the drawings, FIGS. 1, 2, 3 and 4A are, respectively, a plan view, a front view, a sectional view taken along the line III—III shown in FIG. 1 and another sectional view taken along the line IV—IV shown in FIG. 1, of one embodiment of the NC complex automatic lathe. Further, FIGS. 5-7 are a side views and two different sectional views, respectively, showing detailed construction of a comb type tool slide provided in this NC complex automatic lathe. Therefore, the construction of this NC complex automatic lathe will be described mainly based on FIG. 1 with the aid of FIGS. 2-7.

Figure 1:
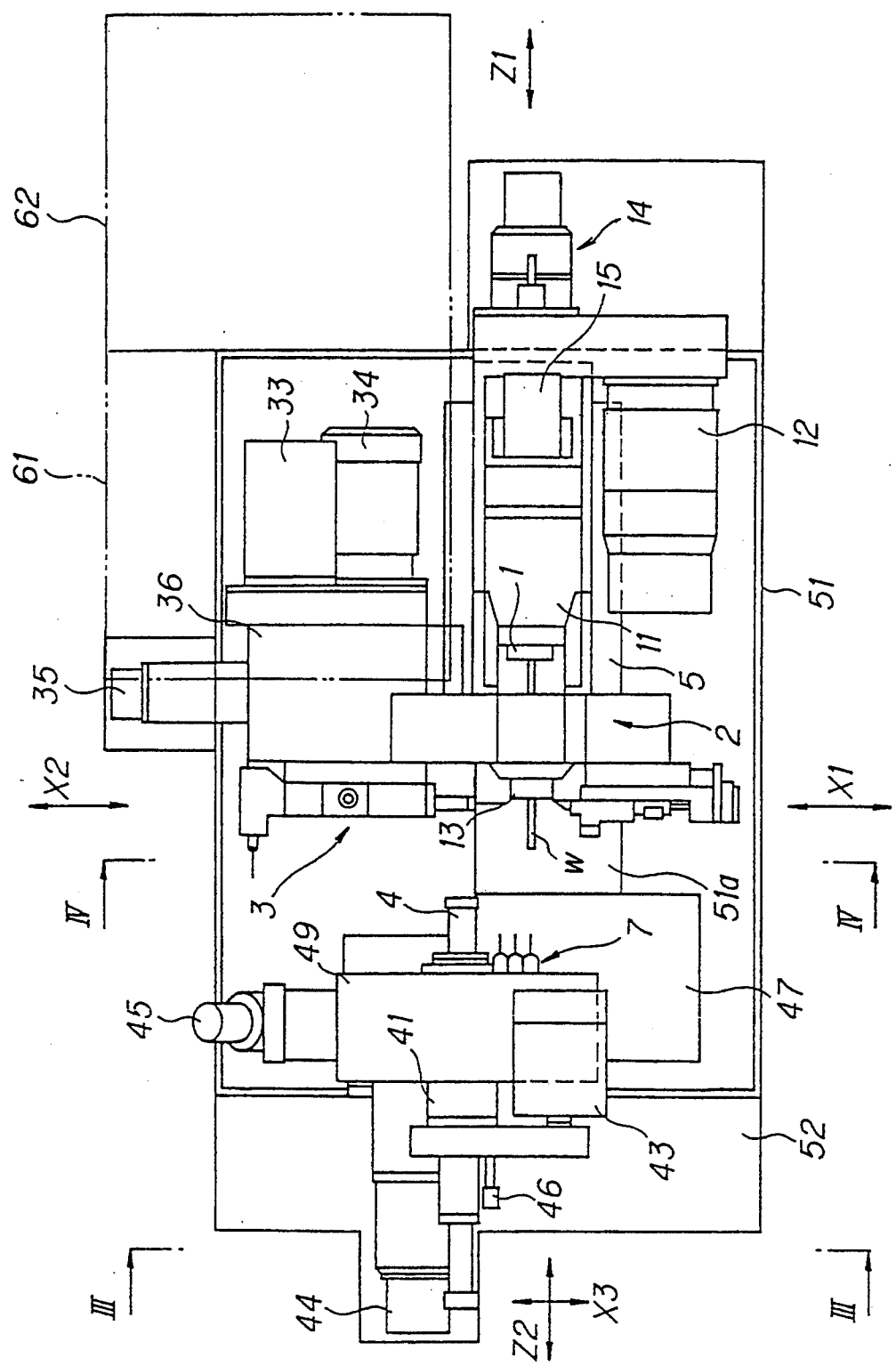
FIG. 1 is a plan view showing one embodiment of the NC complex automatic lathe according to the present invention.
Figure 2:
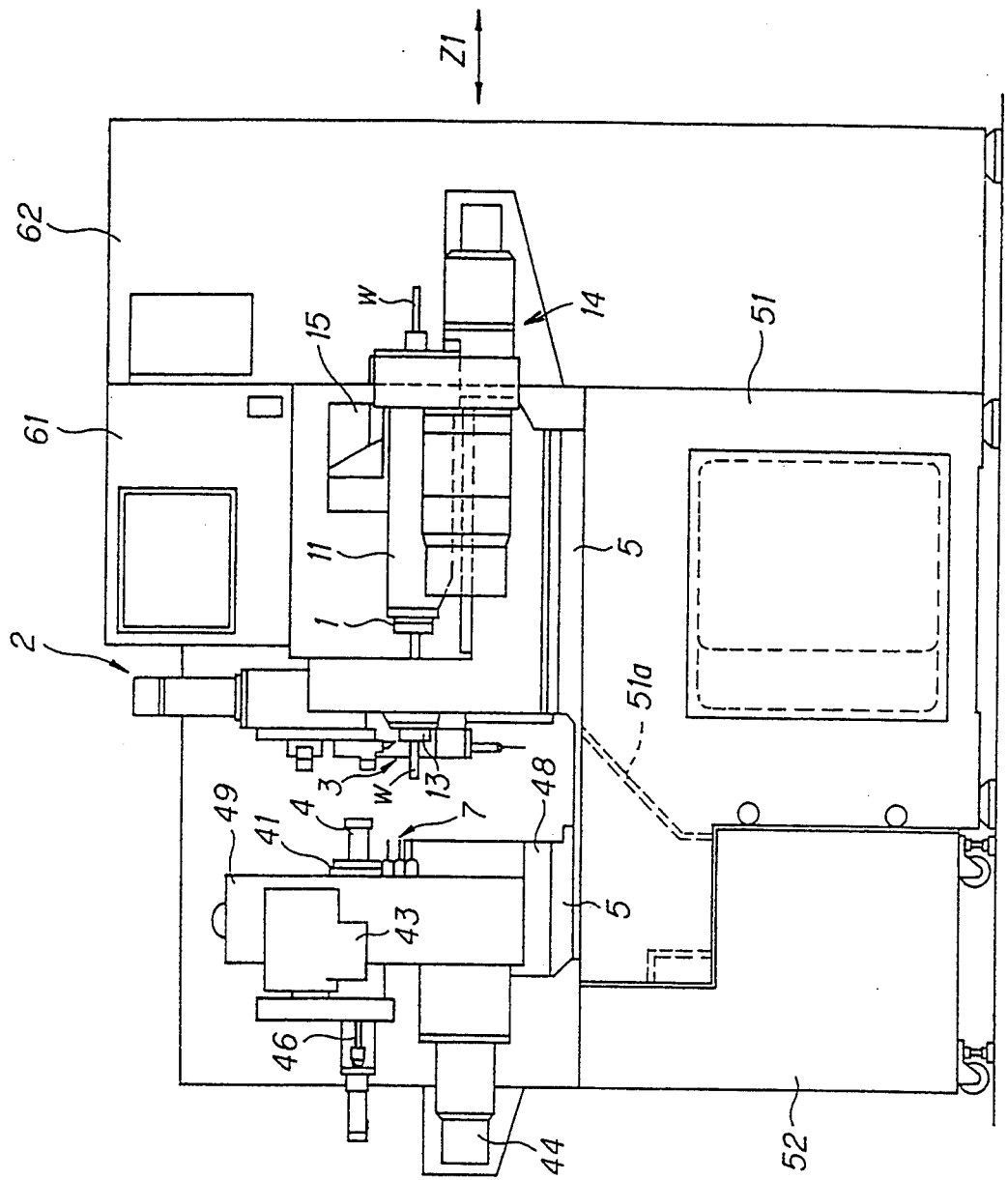
FIG. 2 is a front view of the same embodiment.

Firstly, as shown in FIG. 1, this NC complex automatic lathe is provided on its bed 5 with a pair of a main spindle 1 and a back-main spindle 4 for chucking alternatively a workpiece $\omega$, and a unit of a comb type tool slide 2, a multi-tool slide in the form of a turret tool slide 3 and a front tool slide 7 for machining the workpiece $\omega$ (see FIG. 2). Though the multi-tool slide is comprised of a turret type tool slide 3 in this embodiment, the present invention is not limited to such design but the multi-tool slide can be constructed of, for example, three rear machining tools and one front machining bit.

As shown in FIG. 1, the main spindle 1 receives therein a workpiece $\omega$ for chucking the same such as to protrude a front end portion of the workpiece $\omega$. The main spindle 1 is rotatably supported by a a main spindle base 11. This spindle base 11 can be displaced along a guide grove formed on the bed 5 in a direction Z1 parallel to a center axis or line of the workpiece to feed the workpiece $\omega$ (see FIG. 2). Rotation of the main spindle 1 is effected by a drive of a main spindle main spindle 1 is effected by drive of a main spindle driving motor 12, and the displacement of the main spindle base 11 in the direction Z1 is effected by drive of a Z1 direction displacing mechanisum 14 comprised of a motor and a ball screw etc. Further, as shown in FIG. 2, a position coder 15 is attached to a top portion of the main spindle base 11 for detecting an angular position (index position) of the main spindle 1.

A guide bush 13 or chuck is provided on a front portion of the main spindle 1. The turret type tool slide 3 is disposed on one side of a front end portion of the workpiece $\omega$ which protrudes from the guide bush 13, while the comb type slide 2 composed of a group of tool slide member 21a-21d arranged radially with respect to each other is disposed around the workpiece front end portion in a free space away from a displacement area of the turret type tool slide 3 (see FIG. 4A).

As shown in FIG. 5, this comb type tool slide 2 is constructed such that four tool slide members 21a-21d support respective of various bits 22a-22d, and they are arranged around the workpiece $\omega$ radially at an equiangle of 45°. They are mounted such that tip ends of the bits 22a-22d can be displaced transversely toward a center of the workpiece $\omega$. In this figure, there is provided a vacant tool slide member mount 23' which can mount another tool slide member for use in the NC complex automatic lathe instead of the turret type tool slide 3. For example, a tool slide with a motor may be fixed to the mount 23' by means of screws, and the added tool slide having a bit may be displaced to machine a workpiece.

As shown in FIG. 5, the tool slide member 21a is driven directly in a direction X1a by means of a comb type slide drawing motor 20, while the remaining tool slide members 21b-21d are connected to undergo displacements through a link mechanism L in response to the movement of the first tool slide member 2a. Namely, as shown in this figure, the link mechanism L is comprised of a pair of T-like-shape levers A and B rotatably supported on a tool slide base 23 fixed to the bed 5, and a link rod C connecting between the levers A and B. This link mechanism L is constructed such that the level A is connected to the tool slide members 21a and 21b, and the lever B is connected to the tool slide members 21c and 21d. By such construction, the displacement of the tool slide member 21a in the direction 1a is transmitted through the lever A no either of the tool slide member 21b and the link rod C, while the same displacement is transmitted through the lever A, link rod C and lever B to both of the tool slide members 21c and 21d.

Next, the description is given for the detailed construction of the respective tool slide members 21a-21d. Since the tool slide members 21b, 21c and 21d except the first tool slide member 21a have an identical structure, the particular description will be given for the tool slide members 21a with and 21b reference to their sectional diagrams.

As shown in FIG. 6, the first tool slide member 21a is constructed such that a guide 23a is provided on the tool slide base 23, and a slider 24a is mounted on this guide 23a to undergo displacement in the direction X1a toward a workpiece $\omega$ as indicated by the double-headed arrow in the figure so as to cut the workpiece $\omega$. Namely, the comb type slide driving motor 20 is provided in the tool slide base 23 under the tool slide member 21a, and a rotary shaft 20a of the motor 20 is connected to a bowl screw 25a through a coupling 26a. On the other hand, a nut 28a is fixed to a bottom of the slider 24a and is engaged with the ball screw 25a. By such construction, the slider 24a is slid in the direction X1a by the rotation of the comb type tool slide driving motor 20. In addition, a bit holder 27a is attached to a top portion of the slider 24a on an adjacent side to the workpiece $\omega$ for holding a bit 22a, while a coupling 29a is fixed to an opposite side to couple with the lever A.

Next, as shown in FIG. 7, the second tool slide member 21b of this embodiment is constructed such that a slider 24b is mounted on a guide 23b to undergo displacement is a direction X1b toward the workpiece ω as indicated by the double-headed arrow in the figure to effect cutting of the workpiece ω. Further, the tool slide member 21 is operated such that the bit 22b can advance radially to the center of the workpiece ω precedingly relative to the remaining bits of other tool slide members, and may retract from the center of the workpiece ω after the bit 22b has reached a predetermined position. Namely, while the slider 24b is mounted to undergo sliding movement on the guide 23b provided on the tool slide base 23 as described before, three spring pieces 27b are disposed inside the guide 23b to normally urge the slider 24b away from the workpiece ω.

Further, a bit holder 24b' is disposed on top of the slider 24b for holding the bit 22b. In addition, there are provided a coupling 29b connected to receive from the lever A an external force effective to displace the tool slide member 21b, and regulating means in the form of a selecting cylinder 25b and an adjusted screw 26b. The coupling 29b is connected to the lever A and to a piston 28b (which will be described later in detail) disposed within the selecting cylinder 25b through a rod 28b. The coupling 29b is slideably disposed on the slider 24b so as to transmit the external force from the lever A-not directly to the slider 24b —but indirectly to the slider 24b through the rod 29b' and the selecting cylinder 25b.

The selecting cylinder 25b is slideably disposed on the slider 24b and contains therein the piston 28b connected to the rod 28b'. The cylinder 25b is controlled according to a command from a cylinder control circuit (not shown) to switch oil pressures in cylinder chambers 25b' and 25b''. Namely, the selecting cylinder 25b operates by its oil pressure switching to change a position of the piston 28b so that the selecting cylinder 25b moves back and forth relative to the piston 28b or the coupling 29b. By such operation, the slider 24b can be selected to precedingly advance toward the center of the workpiece ω to enable the bit 22b to effect cutting operation. Further, the bit 22b can be retracted after the advanced bit 22b has reached a predetermined target position.

In addition, the adjusting screw 26b is attached to a bottom of the selecting cylinder 25b in contact at a tip of the adjusting screw 26b with a rear end face of the slider 24b. By adjustively rotating the screw 26b, a mount position of the selecting cylinder 25b is changed on the slider 24b such that the bit 22b of the tool slide member 21b can advance toward the workpiece ω precedingly relative to the remaining bits of other tool slide members.

Thus, the description is completed for the construction of the comb type tool slide 2. Next, returning to FIG. 1, the description is given sequentially for the turret type tool slide 3, the back-main spindle 4, the front tool slide 7 and a controller of the automatic lathe.

Firstly, the turret type tool slide 3 is of an octagonal turret type. In this embodiment four kinds of tools 32a–32d such as bit and drill are attached radially (see FIG. 4A). However, as will be mentioned later in detail at most nine tools can be attached to the turret (see FIG. 8). The index rotation is carried out to set a particular tool to be used for machining in a given working position. Namely, this turret type tool slide 3 is supported by a turret tool slide base 36. This base 36 mounts thereon a stepping motor 33 for stepwise rotating the turret type tool slide 3 for an indexing operation, and a turret tool driving motor 34 for rotational driving of the tools 32a–32d.

Figure 4A:
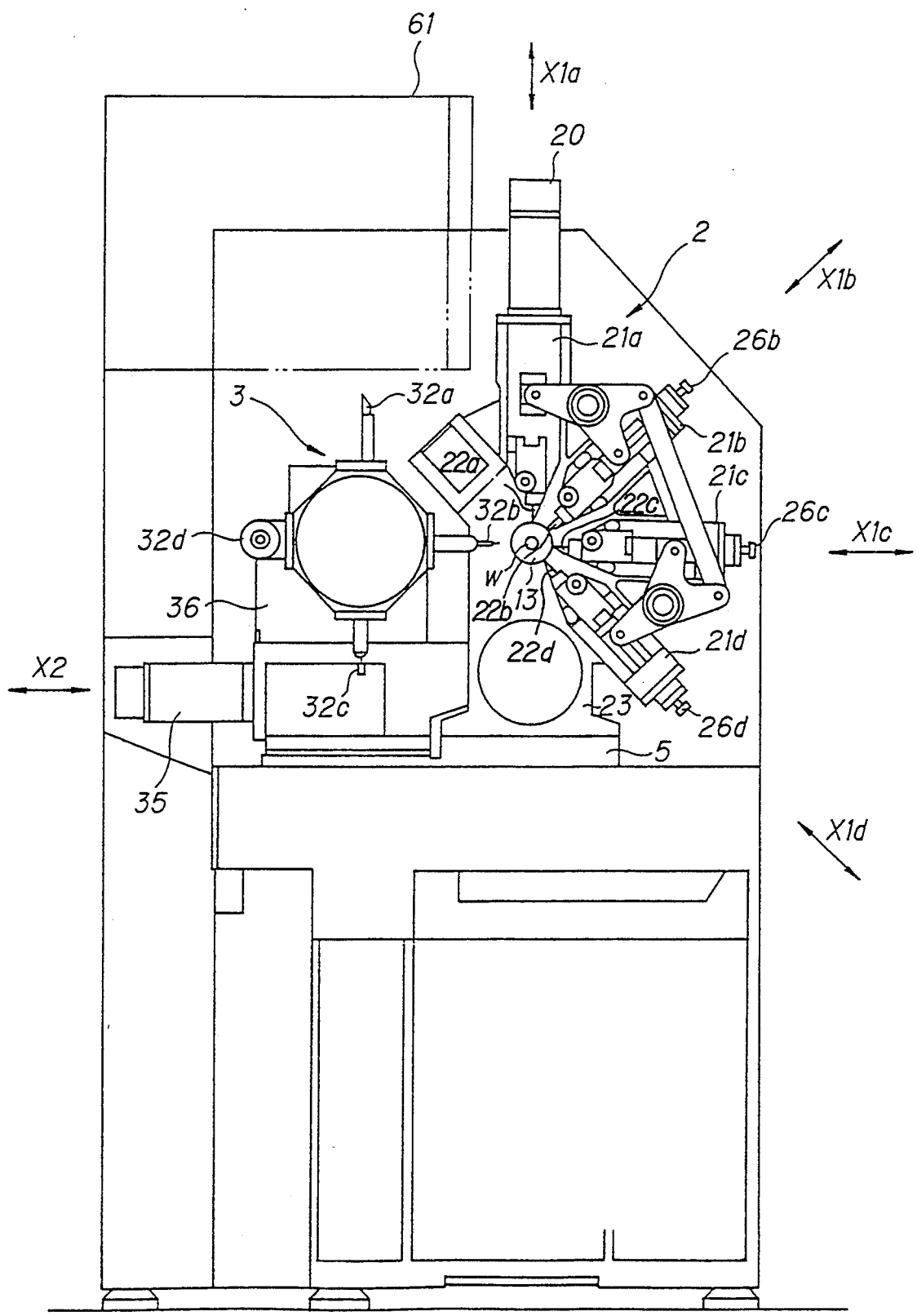
FIG. 4A is another sectional view of the same embodiment, taken along the line IV—IV of FIG. 1.
Figure 4B:
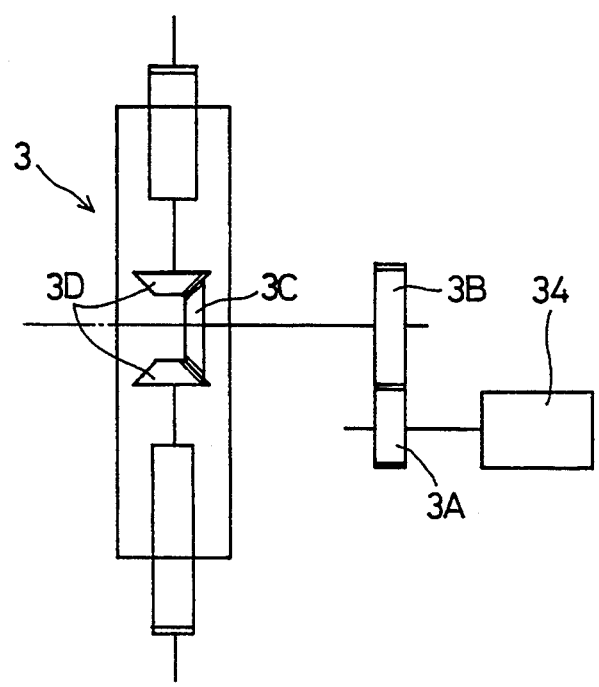
FIG. 4B is a sectional view of a turret type tool slide provided in the FIG. 1 embodiment.

FIG. 4B is a schematic diagram showing the above noted tool rotation mechanism of the turret. A gear wheel 3A fixed to an output shaft of the turret tool driving motor 34 is engaged with another gear wheel 3B fixed to a parallel shaft disposed in the center of the turret type tool slide 3. Further, inside the turret type tool slide 3, a bevel gear 3C fixed to the parallel shaft is engaged with another bevel gear 3D fixed to a rotation shaft of each tool. By such construction, the tools 32a–32d are rotatively driven by the motor 34. Further, the turret type tool slide 3 is stepwise driven by the stepping motor 33 while the gears 3C and 3D are engaged with each other.

The turret tool slide base 36 is disposed on the bed 5 slideably toward the workpiece ω in the direction X2. The turret tool slide base 36 is provided with turret displacing means in the form of an X2 direction displacing mechanism 35 comprised of a servo motor and a ball screw for driving the turret type tool slide 3 in the direction X2.

Next, the description is given for the construction of the back-main spindle 4 and the front tool slide 7 in this embodiment. Firstly, as shown in FIG. 1, the back-main spindle 4 is provided for chucking a workpiece ω from a reverse direction as opposed to the main spindle 1, and is supported rotatably by a back-main spindle base 41. The back-main spindle base 41 is attached to a back-main spindle slider 49. Besides the back-main spindle base 41, this slider 49 mounts thereon a back-main spindle driving motor 43 for rotating the back-main spindle 4, a front tool slide 7 attached with three fixed tools 7a–7c for carrying out drilling in the front end face of the workpiece ω, and a cylinder 46 for selecting one of the tools 7a–7c on the front tool slider 7 and for driving the selected one toward the workpiece ω by hydraulic control (see FIG. 2).

Figure 3:
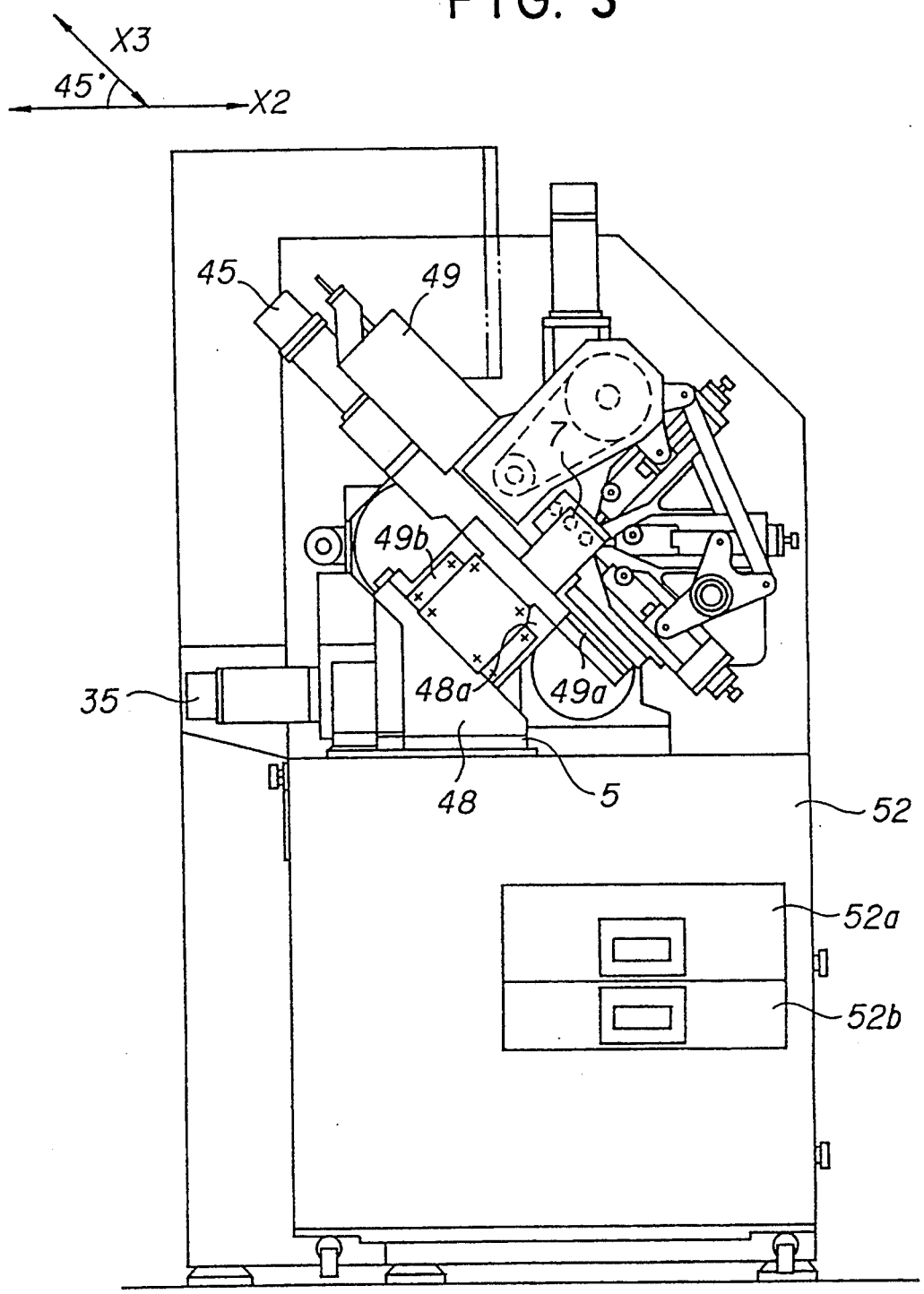
FIG. 3 is a sectional view of the same embodiment, taken along line III—III of FIG. 1.

While this back-main spindle slider 49 is displaceable toward the workpiece ω (in the direction Z2 in the figure), the same slider 49 is also displaceable in a direction X3 which is orthogonal to the direction Z2 and which declines by 45° relative to the horizontal direction, as shown in FIG. 3. Namely, the bed 5 is provided with a fixed back-main spindle mount 48 formed with a slanting face declined by 45° relative to the horizontal direction in parallel to the direction X3. A guide 48a is provided on this slanting face for guiding a back-main spindle table 49a in the direction Z2. While the back-main spindle table 49a is held in a declined state by 45° relative to the horizontal direction as shown in the figure, the table 49a is driven by the Z2 direction displacing mechanism 44 along the guide 48a to undergo displacement in a center axis direction of the workpiece ω, i.e., in the direction Z2.

Further, the back-main spindle table 49a is formed thereon with a guide face of the direction X3. The back-main spindle slider 49 is attached to this guide face displaceably in the direction X3 by the driving of the X3 direction displacing mechanism 45.

In addition, there are disposed under the fixed back-main spindle mount 48 a leg 51 for supporting the bed 5 and a detachable coolant tank 52 (see FIG. 2). The coolant tank 52 is operated to collect and discharge swarf of the cut workpiece ω, and is provided with two kinds of filters 52a and a 52b for filtering cutting oil containing swarf (see FIG. 3). Further in FIG. 1, a drop opening 47 is formed on the bed 5 to collect swarf of the workpiece ω to the coolant 52. A slanting portion 51a is provided on the leg potion 51 to guide swarf to the coolant tank 52. There are provided an operation box 61 and a control box 62 containing a numerial controller. Thus, the description is completed with respect to the construction of the NC complex automatic lathe.

Next, the description is given for one example of machining operation a workpiece by the complex automatic lathe constructed as described above. Firstly, for example in FIG. 4A, the machining is carried out by a rough cutting bit 32a of the turret type tool slide 3 and a finish working bit 22c mounted on the tool slide member 21c of the comb type tool slide 2, arranged in opposed relation to the bit 32a through a workpiece.

In this case, the turret type tool slide 3 is rotated by 90° clockwise in the figure so as to set the bit 32a in a given working position by means of the step motor or index motor 33. On the other hand, in the comb type tool slide 2, since the tool slide member 21C concurrently displaces in the same direction as the tool slide member 21a, the selecting cylinder 25C is operated to select the tool slide member 21C to approach the same toward the center of the workpiece ω. Meanwhile, the adjusting screw 26C is utilized to advance the tool slide member 21C relative to the tool slide member 21a toward the workpiece ω.

Then, the turret type tool slide 3 is displaced by the X2 direction displacing mechanism 35, and the tool slide member 21c is displaced by the comb type tool slide driving motor 20, so that both of the bits 32a and 22c cooperatively carry out the machining of the workpiece ω. Therefore, according to this working pattern, the bit 32b of thee turret type tool slide 3 and the bit 22c of the comb type tool slide 2 are utilized to effect concurrent machining of rough cutting and finish working.

Further, these bits 32b and 22c are perfectly opposed to each other to enable concurrent machining of the workpiece ω. The guide bush 13 receives forward transverse force and reverse transverse force which cancel with each other during the cutting operation. The workpiece ω receives also canceled load to thereby realize a perfectly balanced cutting operation to improve the cutting efficiency and the cutting accuracy.

Moreover, the turret type tool slide 3 is provided with a rotary tool such as a drill to enable secondary machining such as front drilling in the front end face of the workpiece ω and transverse drilling. In addition concurrent machining can be carried out using a tool of the turret type tool slide 3 and another tool of the comb type tool slide. In such case, in the comb type tool slide 2, a pair of tool slide members, for example, 21a and 21c displaceable in the same direction are selected from the concurrently driveable four tool slide members for holding, respectively, a bit 22a of the finish working type and a bit 22c of rough cutting type.

Then, in the tool slide member 21c, the oil pressure of the pair of cylinder chambers is switched in the selecting cylinder to thereby approach the tool slide member 21c toward the workpiece center to place the same in the substantially identical position as that of the tool slide member 21a. Further, in order to sequentially effect rough cutting and finish working, the adjusting screw of the tool slide member 21c is utilized such that the rough cutting bit 22c is provisionally advanced relative to the finishing bit 22a toward the workpiece ω by a given finish margin.

In the thus set comb type too slide 2, the comb type tool slide driving motor 20 rotates in response to a drive command to advance the tool slide members 21a and 21c. At this moment, when the bit 22c reaches a given initially set position, i.e., rough cutting end point, the cylinder control circuit (not shown) outputs a command effective to switch the oil pressure of the cylinder chambers of the tool slide member 21c in the corresponding selecting cylinder to return the tool slide member 21c.

Figure 9:
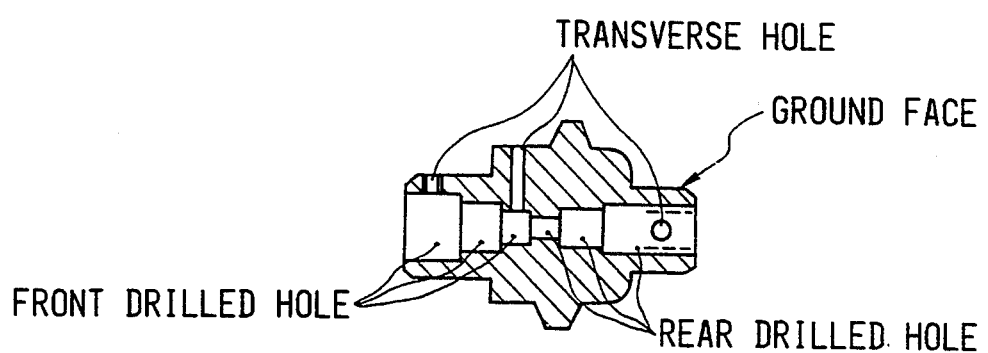
FIG. 9 is a sectional view of a workpiece ω machined by the inventive lathe.
Figure 10A:
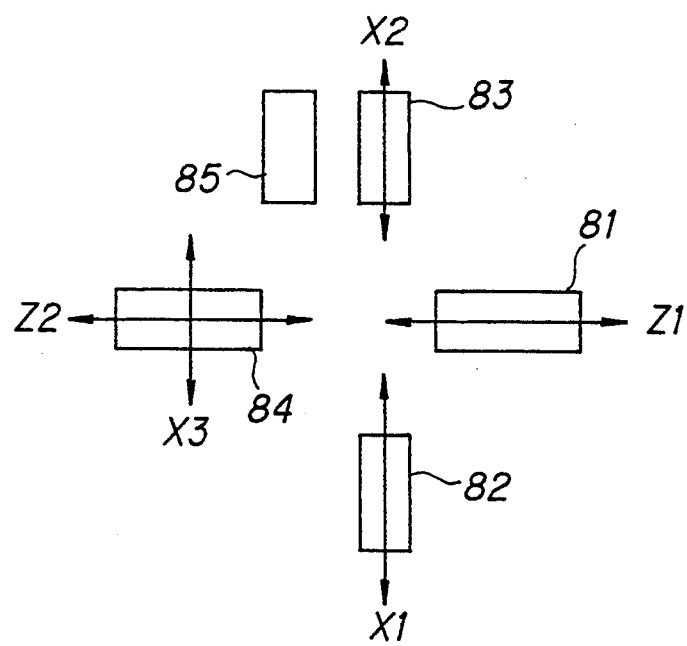
FIG. 10A is an illustrative diagram showing one example of the conventional front and rear machining method.
Figure 10B:
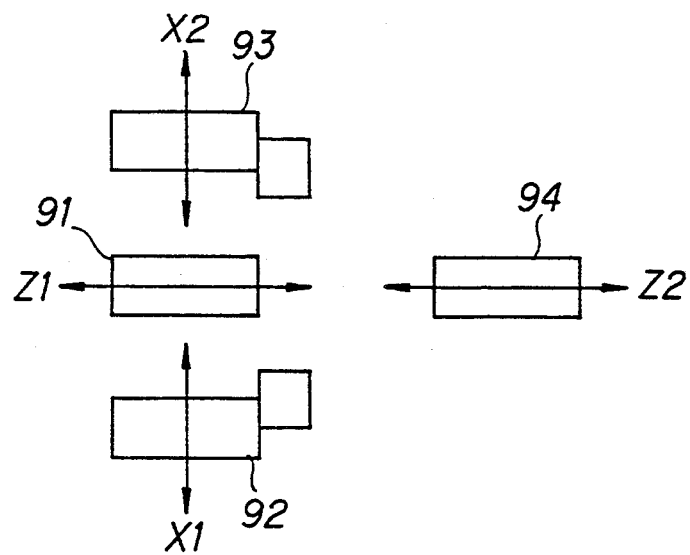
FIG. 10B is an illustrative diagram showing another example of the conventional front and rear machining method.

On the other hand, the slider of the tool slide member 21c is normally urged by elastic force of the spring in a direction away from the workpiece ω. Therefore, the slider is retracted relative to the lever B or the associate coupling so that the tool slide member 21c is entirely placed away from the workpiece ω. Therefore, the bit 22c is suspended from cutting operation. Thus after the rough cutting by the bit 22c, the bit 22a is driven to carry out finish working to a given finish point. Therefore, according to this cutting work pattern, the single of the comb type tool slide driving motor 20 is utilized to effect sequential machining of preceding rough cutting and succeeding finish working. Further, a tool of the turret type tool slide is added to carry out different types of simultaneous cutting work such as internal grinding besides the rough cutting and finish working. Consequently by the combination of the turret type tool slide and the comb type tool slide, for example, the workpiece ω can be shaped as shown in FIG. 9, thereby increasing freedom of machining and expanding an object to be machined to effect complex machining.

As described above, according to the first aspect of the invention, the turret type tool slide is disposed around a front end portion of the workpiece to undergo displacement toward a center of the workpiece, while a plurality of tool slide members are disposed radially around the front end portion of the workpiece in a free space away from the moving area of the turret type tool slide to undergo respective displacements toward the workpiece center. By such construction, sequential machining can be carried out in the order of, for example, rough machining and finish working. The turret type tool slide can be efficiently utilized to carry out various kinds of machining such as internal grinding and transverse drilling. Consequently, the freedom of machining can be increased to expand an object to be processed to thereby achieve complex processing, while improving the machining accuracy.

Next, the description is given for the more sophisticated operation of the NC complex automatic lathe constructed as described above, by examples of two machining patterns of workpiece.

Front drilling work by a tool of the front tool slide 7

In this machining pattern or mode, the front tool slide 7 is driven by the Z2 direction displacing mechanism 44 to slide in the Z2 direction, and the tool 7a displaced by the X3 direction displacing mechanism 45 in the direction X3 according to an X3 direction NC data of the tool 7a. By such operation, the tool 7a is positioned such that its center axis aligns with the center of the workpiece ω for machining of the workpiece ω.

Next, the tool 7a is selected by the cylinder 46. Then, the cylinder 46 displaces the tool 7a forwardly to the workpiece ω, such that the tool 7a protrudes relative to the remaining tools 7b and 7c and relative back-main spindle 4 to thereby effect machining of the workpiece ω by the tool 7a. Then, the tools 7b and 7c are sequentially displaced to the center of the workpiece to carry out subsequent drilling work.

Rear drilling work by the turret type tool slide 3 while the back-main spindle 4 chucks the workpiece ω after cutting off the workpiece ω

Namely, this machining mode is carried out after the completion of rough gringing by the turret type tool slide 3 or the front tool slide 7, or finishing work, or front machining such as front drilling of the workpiece front end face, or secondary working such as transverse drilling, thereby effecting shaping of the workpiece as shown in FIG. 9.

Figure 8:
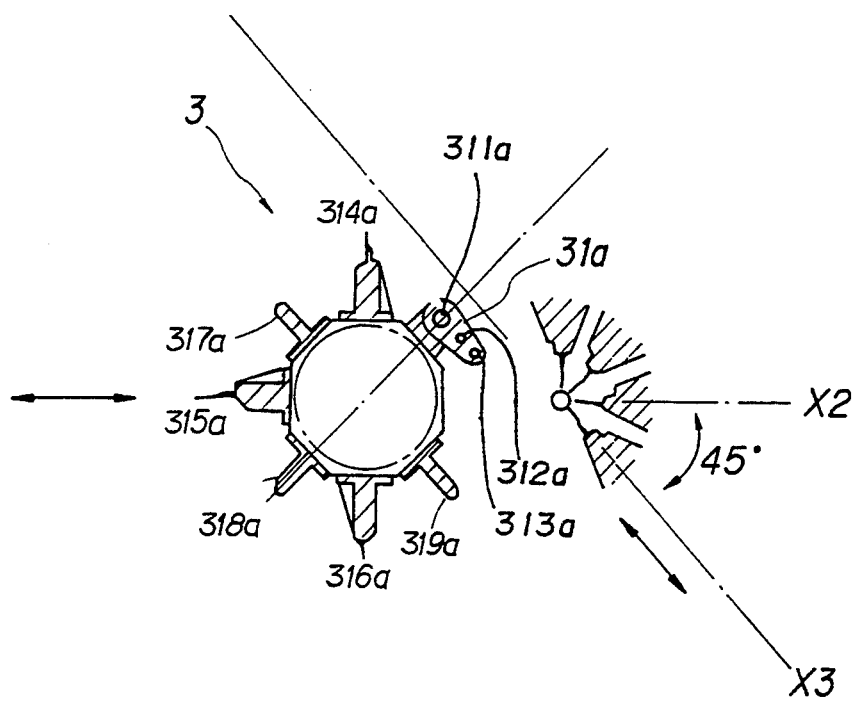
FIG. 8 is a sectional view showing another example of the turret type tool slide.

In this example, the machining mode is carried out using the turret type tool slide 3 provided with rear drill shafts 311a–313a, three bits 314a–316a three transverse drill shafts 317a–319a, as shown in FIG. 8.

Firstly, centering is carried out for the three rear drill shafts of tool 31a of the turret type tool slide 3, and their positional values are determined as index data with respect to the directions X3 and X2. Then, the workpiece ω is cut from the main spindle by a cutting tool attached to either of the comb type tool slide 2 or the turret type tool slide 3 at the vicinity of the guide bush 13. At this moment, immediately cutting off the workpiece ω, the back-main spindle 4 is operated to chuck the workpiece ω to thereby effect transfer of the workpiece ω. Namely, in a manner similar to the previously mentioned machining pattern, the back-main spindle 4 is positioned in alignment with the workpiece center by means of the X3 direction displacing means 45, and then the back-main spindle 4 is displaced to the workpiece ω by means of the Z2 direction displacing mechanism 44 (see FIG. 1). Then, the back-main spindle 4 is rotated by the back-main spindle driving motor 43 in synchronization with the rotation of the main spindle 1 so as to chuck a protruded front end portion of the workpiece ω. Next, a rear face, that is, a cut end face of the transferred workpiece ω, is machined by the three rear drill shafts 311a–311c of the tool 31a mounted on the turret type tool slide 3 shown in FIG. 8. Alternatively, drilling may be carried out by a rotary tool 32d shown in FIG. 4A.

In this embodiment, the back-main spindle 4 which chucks the workpiece ω is displaced by the X3 direction displacing mechanism 45 in the direction X3 which declines by 45° relative to the horizontal direction toward the turret type tool slide 3 (see FIG. 3). Concurrently, the turret type tool slide 3 is rotated by the stepping motor 33 (see FIG. 1) so as to displace a particular tool to a given working position for the drilling operation, while the same slide 3 is displaced to the direction X2 by the X2 direction displacing mechanism 35. In this case, the working position of the rear drilling tool 31a of the turret type tool slide 3 is indicated in FIG. 8, such that the advancing direction of the respective tools intersects with the direction X3 which is the displacement direction of the back-main spindle 4.

By this, in the turret type tool slide 3 shown in FIG. 8, firstly the rear drilling shaft 311a is aligned with the workpiece center, and then the two rear drilling shafts 312a and 313a are sequentially positioned in place. At this moment, the rear drilling shafts 312a and 313 are positioned according to the centering position data with respect to the directions X2 and X3. Therefore, even if there is an indexing error of the turret type tool slide or a mount error of the tools attached to the turret type tool slide, this position data is adjusted to compensate for these errors.

As described above, according to the second aspect of the invention, in the automatic lathe provided with a main spindle and a back-main spindle, a pair of a comb type tool slide and a multi-tool slide are mounted such that, for example, the comb type tool slide may hold a finishing tool and the multi-tool slide may hold a rough cutting tool, a transverse drilling tool, a rear drilling tool and a rear grinding tool, thereby effecting highly accurate finishing work and improving significantly rear machining accuracy.

Further, in the NC complex automatic lathe provided with the main spindle and back-main spindle as well as the pair of the comb type tool slide and multi-tool slide, the displacement direction of the multi-tool slide by means of the multi-tool displacing means is set to intersect with the displacement direction of the back-main spindle base. The numerical control means is operated to control the displacements of the multi-tool slide and the back-main spindle bace. By such construction, even if there is a positional error of tools on the multi-tool slide, the machining can be effected through corrective alignment effective to correct for the error, thereby achieving the additional effect of improving the rear machining accuracy as well as the main effect of the invention.

Moreover, according to the second aspect of the invention, the multi-tool slide is comprised of a turret type tool slide, thereby achieving various effects such that a number of tools can be adopted, machining freedom can be improved, and two separate processings can be combined in a signal processing. In addition, even if there is an indexing error of tools in the turret type tool slide or a positional error of tools mounted on the turret type tool slide, the positioning operation is carried out to compensate for these error to carry out machining, thereby improving rear machining accuracy. Particularly, when the turret type tool slide is adopted to hold a rear drilling tool and a rear cutting bit (though not illustrated in the drawings) to carry out rear machining of a workpiece which is chucked by the back-main spindle, correcting operation for centering gap or centering height is carried out to enable highly accurate rear machining.

Figure 11:
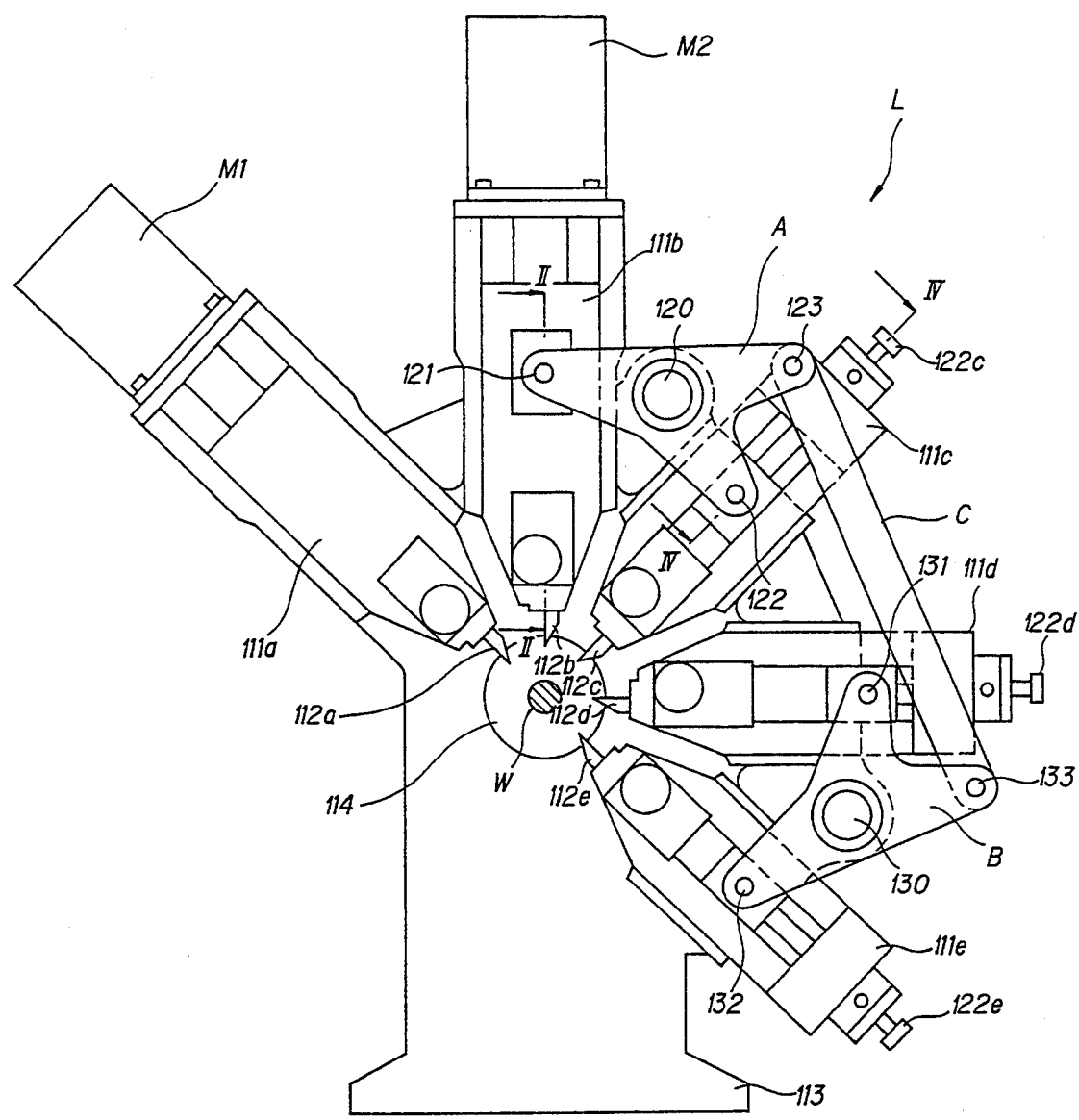
FIG. 11 is a side view showing an essential part of another embodiment of the inventive lathe.

Hereinafter, another embodiment of the NC automatic lathe according to the present invention will be described in conjunction with the drawings. FIG. 11 is a side view showing a basic construction of the lathe. In this embodiment, various kinds of bits 112a–112e are attached to five tool slide members 111a–111e, which are arranged equi-angularly (45°) around a workpiece ω of longitudinal shape. Both of the end tool slide members 111a and 111e are opposed to each other through the workpiece ω such that they can displace transversely toward the center of the workpiece ω so that a tip of the bit 112a held in the tool slide member 111a and another tip of the bit 112e held in the other tool slide member 111e are alingned linearly with each other through the center of the workpiece ω. On the other hand, the remaining tool slide members 111b–111d other than the side tool slide members 111a and 111e are provided such that tip ends of their bits 112b–112d displace toward the center of the workpiece ω. The workpiece ω is rotatably supported by a guide bush 114.

Further, the tool slide members 111a and 111b are driven directly by respective servo motors M1 and M2 as described later in detail, while the remaining tool slide members 111c, 111d and 111e receive the movement of the tool slide member 111b through a link mechanism L to undergo displacements. Namely, as shown in the figure, the link mechanism is comprised of a T-like-shape levers A and B, and a coupling rod or link C connecting between the levers A and B. The lever A has a pivot pin 120 fixed to a base 113 and three couplings 121–123. The other lever B has a pivot pin 130 fixed to the base 113 in manner similar to the lever A, and three couplings 131–133.

This link mechanism L is constructed such that the tool slide member 111b and the tool slide member 111c are coupled to each other through the two couplings 121, 122 of the lever A so that the displacement of the tool slide member 111b is transmitted to the tool slide member 111c through the lever A. On the other hand, the tool slide member 111d and the tool slide member 111e are coupled to each other through the two couplings 131, 132 of the lever B. Further, the third coupling 123 of the lever A and the third coupling 133 of the lever B are connected to each other through the rod C so that the displacement of the tool slide member 111b is transmitted to the tool slide members 111d and 111e through the lever A, link C and lever B. Therefore, the tool slide members 111b–111e are coupled together by the link mechanism L such that adjacent tool slide members displace in opposite directions, and every other one of the tool slides displaces in the same direction.

Next, the description is given for the construction of the respective tool slide members 111a–111e. The tool slide member 111a has substantially the same structure as that of the tool slide member 111b except that the level A is not attached to a slide of the tool slide member 111a. Further, the tool slide members 111d and 111e have the same structure as that of the tool slide member 111c except that different levers are connected thereto. Therefore, the specific description will be given for the construction of the tool slide members 111b and 111c with reference to their sectional diagrams.

Figure 12:
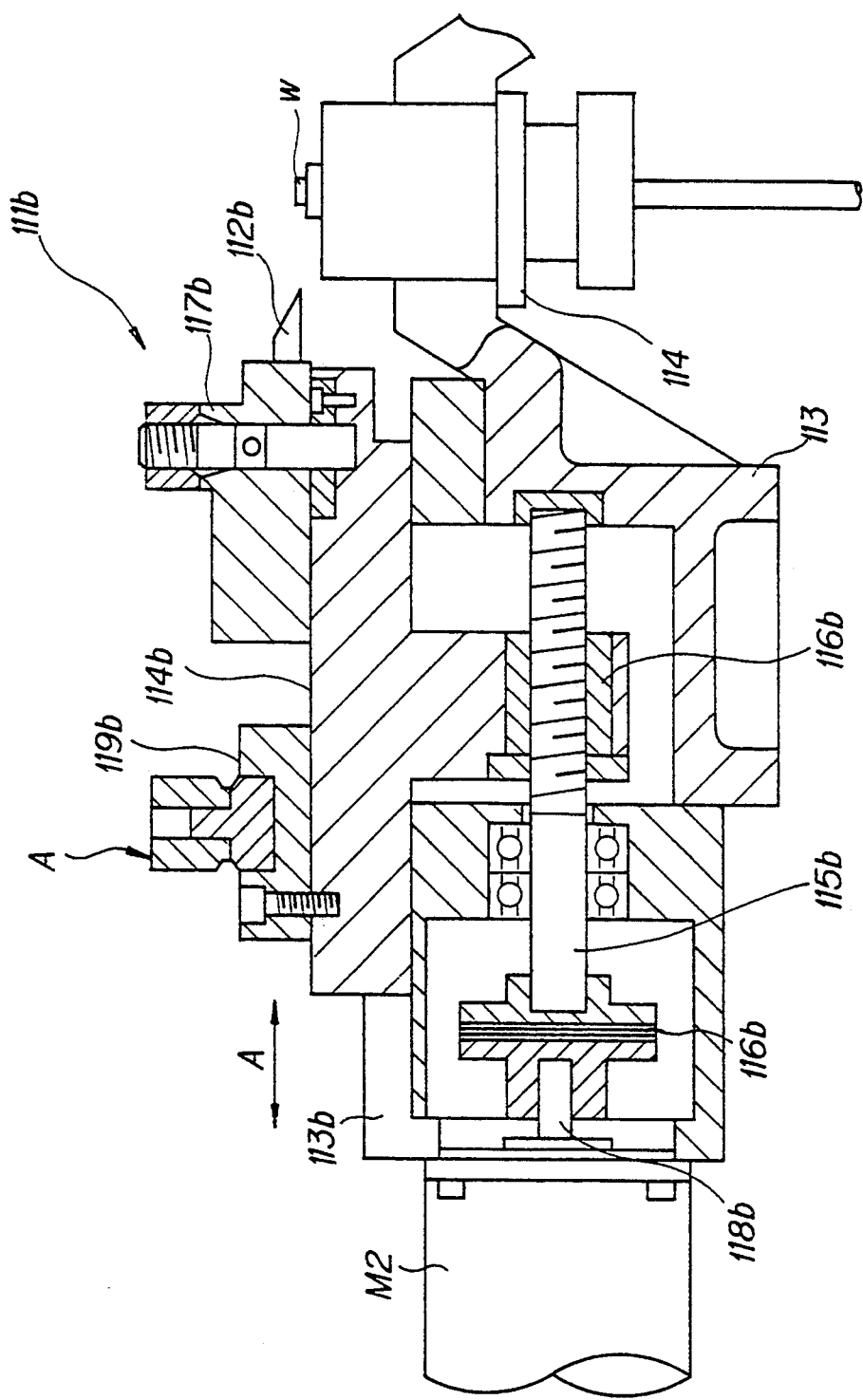
FIG. 12 is a sectional view of one tool slide member taken along the line II—II of FIG. 11.
Figure 13:
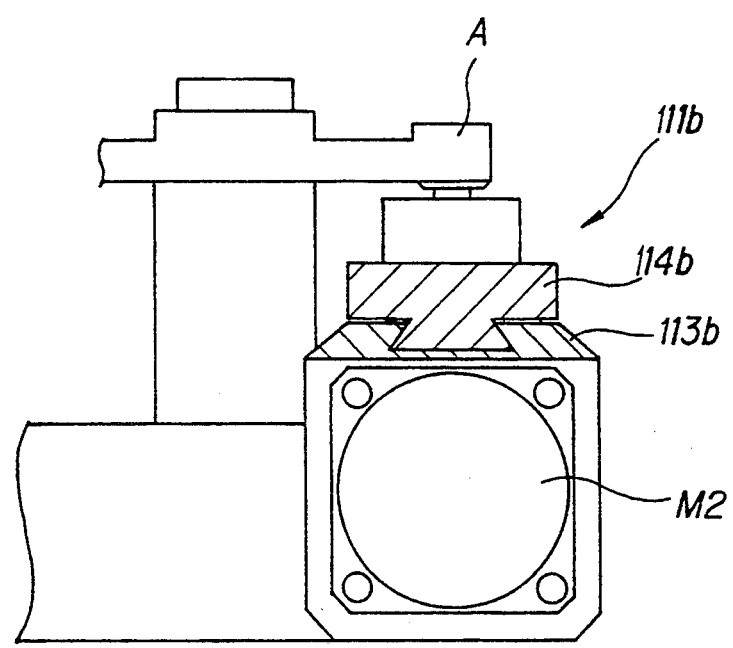
FIG. 13 is a partial sectional view showing engagement between a slider of the FIG. 12 tool slide member and a guide.

Firstly, FIG. 12 is a sectional view of the tool slide member 111b, taken along the line II—II of FIG. 11. The slide member 111b is constructed such that a slider 114b is mounted on an guide 113b which is fixed to the base 113 engaged with the guide 113b slideably in the direction indicated by double headed arrow A of FIG. 12. Namely, the servo motor M2 is attached to the guide 113b which a rotation shaft of the servo motor M2 is connected to a ball screw 115b through a coupling 116b so as to transmit the rotation of the servo motor M2 to the ball screw 115b.

Further, a nut 116b is fixed to the bottom portion of the slider 114b in thread engagement with the ball screw 115b such that the rotation of the servo motor M2 is converted into linear movement. A bit holder 117b is attached to a top portion of the slider 114b by means of screws adjacently to a workpiece ω for holding a bit 112b. A coupling 119b is attached oppositely to the bit holder 117b in coupling with the lever A.

Figure 14:
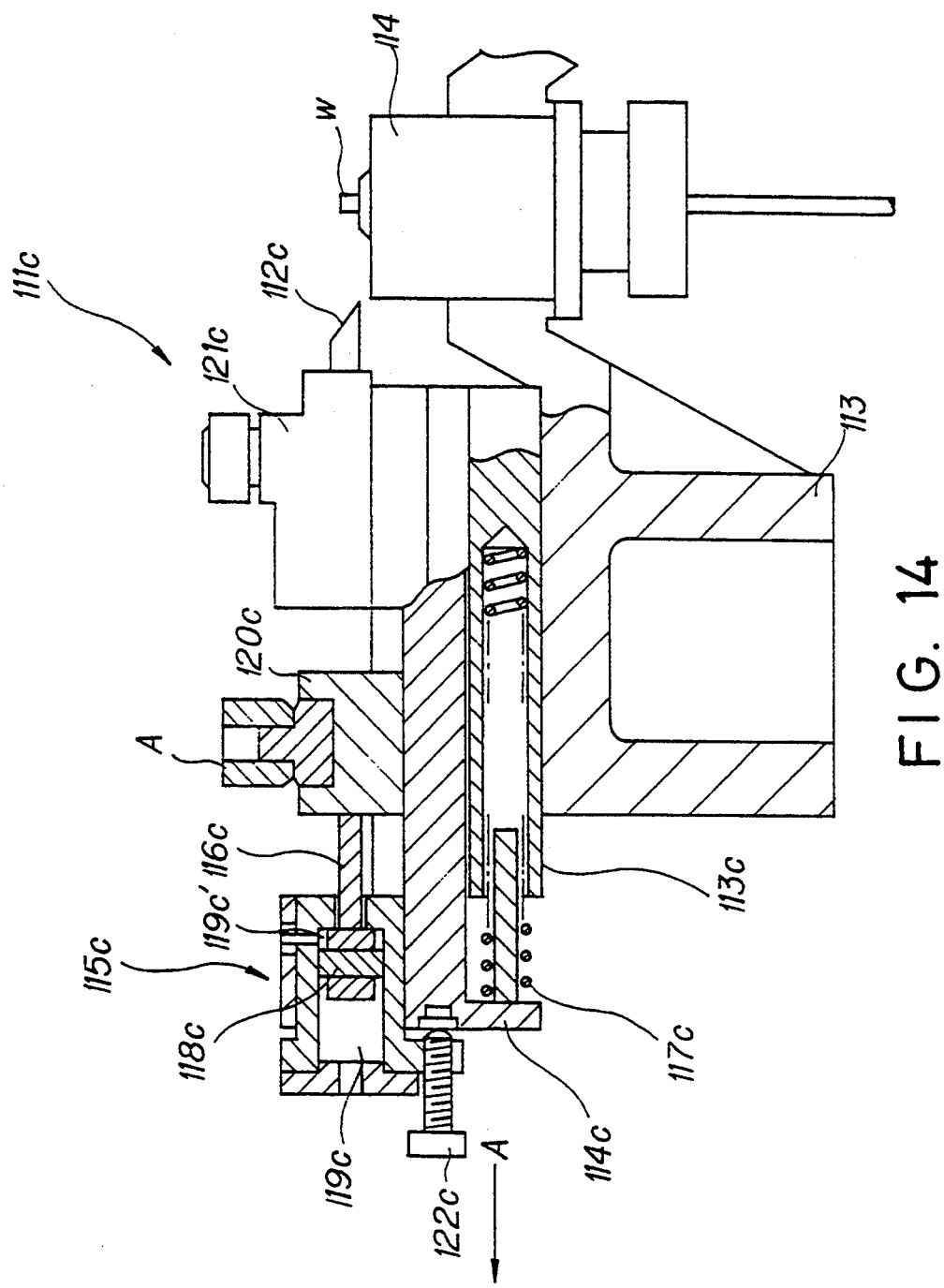
FIG. 14 is a sectional view of another tool slide member taken along the line IV—IV of FIG. 11.
Figure 15:
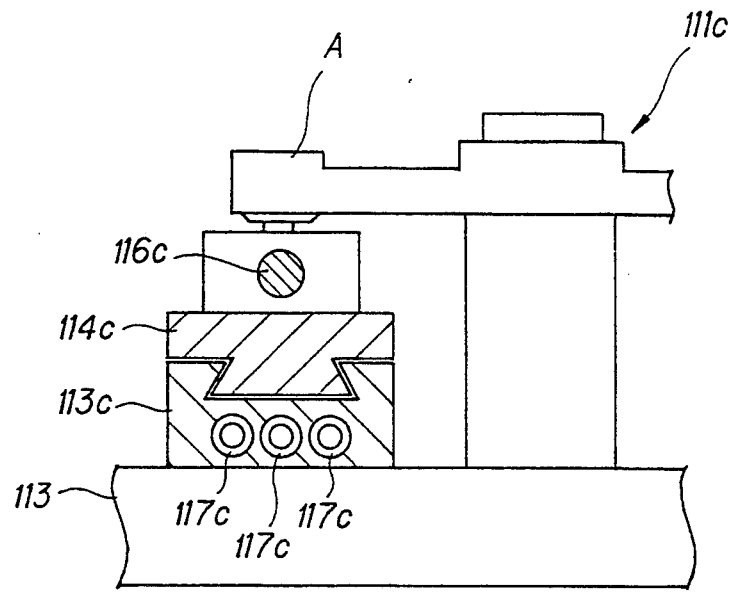
FIG. 15 is a partial sectional view showing engagement between a slider of the FIG. 14 tool slide member and a guide.

Next, FIG. 14 is a sectional view of the tool slide member 111c, taken along the line IV-IV line of FIG. 11. The tool slide member 111c is constructed as shown in the figure such that an operating force from the lever A is received at a coupling 120c to transmit the same to a slider 114c. The slider 114c can be displaced along a guide 113c toward a workpiece ω. A bit 112c can be advanced with respect to bits of other tool slider members, and further the bit 112c can be retracted away from the center of the workpiece after it has reached a given position. Namely, as shown in FIG. 15, the slider 114c supports a bit holder 121c which holdes the bit 112c, and is engaged with the guide 113c provided on the base 113 to undergo sliding movement along the guide 113c. There springs 17c are provided within a body of the guide 113c for normally urging the slider 114c away from the workpiece ω in the direction A of FIG. 14. Further, the slider 114c mounts thereon, besides the bit holder 121c, a coupling 120c to which an external force is transmitted from the lever A to drive the tool slide member 111c, a selecting cylinder 115c in the form of tool slide selecting means, and an adjusting screw 122c as adjusting means.

The coupling 120c is connected to the lever A, and is also connected to a piston 118c within the selecting cylinder 115c (which will be described later in detail). The coupling 120c is slideably disposed on the slider 114c such as to transmit the external force from the lever A to the slider 114c indirectly through a rod 116c and the selecting cylinder 115c—not directly to the slider 114c.

Further, the selecting cylinder 115c is slideably disposed on the slider 114c and contains therein a piston 118c coupled to the coupling 120c through the rod 116c. The cylinder 115c is operated according to a command from a cylinder control circuit (not shown in the figure) to switch oil pressures of cylinder chambers 119c and 119c'. Namely, the selecting cylinder 115c operates to change a position of the piston 118c by the switching of its oil pressure to thereby undergo movement back and forth relative to the piston 118c or coupling 120c, thereby precedingly advancing the slider 114c toward the center of the workpiece ω to effect cutting by the bit 112c (selection of the tool slide member), or retracting the bit 112c after the precedingly advanced bit 112c has reached a given position (retraction of the tool slide member).

Further, the adjusting screw 122c is attached to a bottom end of the selecting cylinder 115c in contact at its tip end with a rear end face of the slider 114c. By rotation thereof, a setting position of the selecting cylinder 114c can be adjusted on the slider 114c so as to advance the bit 112c of the tool slider member 111c with respect to bits of other tool slide members toward the workpiece ω.

Next, the description is given for the operation of the lathe with reference to two kinds of machining patterns or modes. With regard to the first machining pattern, referring to FIG. 11, the same kind of bits 112a and 112e are mounted on the respective tool slide members 111a and 111e which are opposed to each other through the workpiece ω. The servo motor M1 and M2 are driven to effect concurrent cutting work by the bits 112a and 112e.

In this case, the tool slide member 111a is directly driven by the servo motor M1 to undergo displacement. On the other hand, the tool slide member 111e is driven through the link mechanism L according to the displacement of the tool slide member 111b driven by the servo motor M2 to thereby undergo the displacement concurrently in the same direction as the tool slide member 111c. Therefore, the oil pressures of the selecting cylinders of the tool slide members 111c and 111e are switched so as to select the tool slide member 111e. By such operation, the tool slide member 111e is approached to the center of the workpiece ω, while the tool slide member 111c is retracted to stay away from the center of the workpiece ω. In such settings, the distances of the bits 112a and 112e from the center of the workpiece ω are made equal, and the bit 112e is advanced relative to the bit 112c toward the center of the workpiece ω by a given amount which should be set greater than a cutting depth by the bit 112e.

Next the description is given for the concurrent cutting work in the thus set lathe. Firstly, the servo motors M1 and M2 start rotation in response to drive commands so that the tool slide members 111a, 111c and 111e concurrently advance toward the center of the workpiece ω. Since the tool slide members 111a and 111e precede the tool slide member 111c, the bits 112a and 112e come in contact with the workpiece ω earlier than the bit 112c to effect concurrent cutting of the workpiece ω by a given cutting depth.

At this moment, the bit 112c stays rearward from the center of the workpiece further than the cutting depth of the bit 112e, hence the bit 112c does not come in contact with the workpiece ω to suspend its cutting work even after the bits 112a and 112e have finished the cutting work of the workpiece ω. Therefore, according to this machining pattern, the pair of bits 111a and 111e are perfectly opposed to each other and concurrently enter into the workpiece ω. Thus, the guide bush receives opposite transverse force components to cancel with each other during the cutting operation. Further, the workpiece ω receives a canceled load to ensure perfectly balanced machining to thereby improve cutting efficiency and cutting accuracy.

Next, with respect to a second machining pattern, sequential cutting work is carried out by three bits such that a bit 112a of the internal grinding type is attached to the tool slide member 111a driven directly by the servo motor M1 and selected ones of the bits 111b and 111d for finishing work and rough machining are attached to the corresponding ones of the tool slide members 111b and 111d which are driven concurrently by the servo motor M2 to undergo displacements in the same direction.

Figure 16:
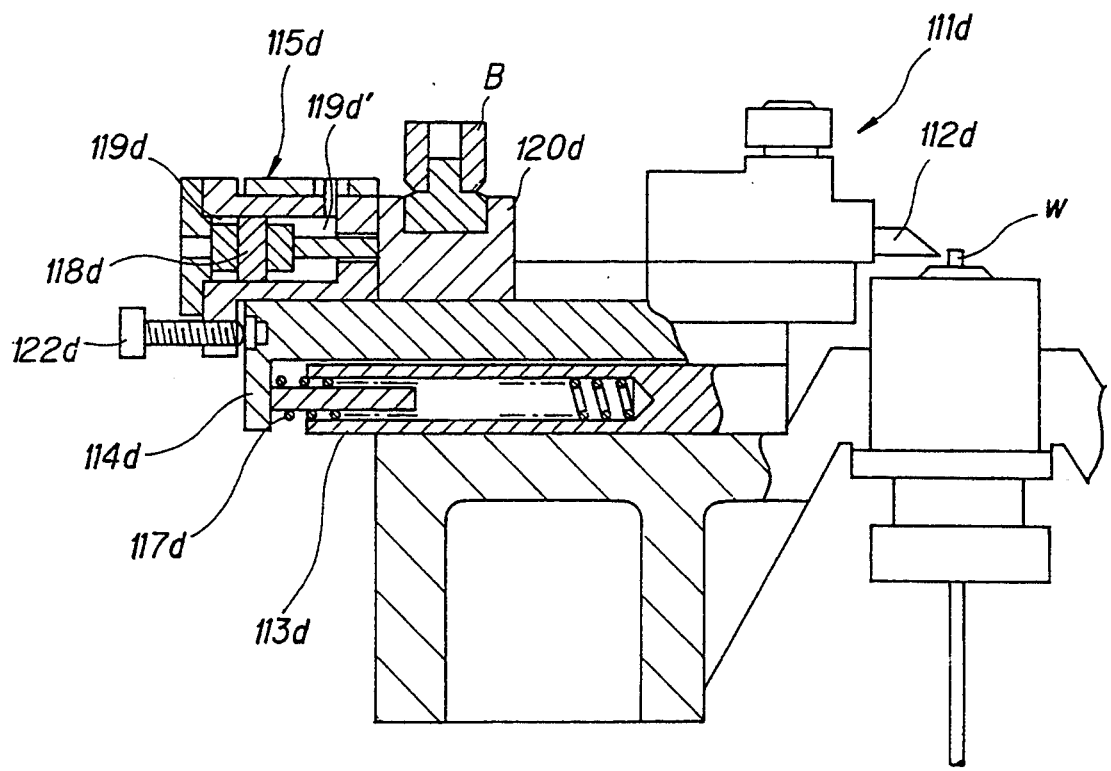
FIG. 16 is a partial sectional diagram showing a state where still another tool slide member is selected by the selecting cylinder.

In this case, as shown in FIG. 16, the tool slide member 111d is controlled such that the oil pressures of the cylinder chambers 119d and 119d' are switched within the selecting cylinder 115d so that the tool slide member 111d is selectively approached toward the center of the workpiece ω to stay in the substantially same position as the tool slide member 111b. In order to sequentially carry out rough machining and finishing work, the bit 112d of the rough machining type is provisionally preceded by means of the adjusting screw 122d relative to the bit 112b of the finishing work type through a distance corresponding to a finishing margin of the workpiece ω.

Next, the description is given for the sequential cutting work by means of the three bits set in the lathe as described above. Firstly, when drive commands are fed to the servo motors M1 and M2, the servo motor M1 rotates to advance the tool slide member 111a, while the servo motor M2 drives to advance the tool slide member 111b.

With the advancement of the tool slide member 111b, the lever A is pivoted to retract the tool slide 111c and concurrently to pull the link C through the lever A. Then, the lever B is also pivoted by the pulled link C in the same direction as the lever A to thereby advance the tool slide member 111d and concurrently to retract the tool slide member 111e. Consequently, the tool slide members 111a, 111b and 111d concurrently advance toward the workpiece ω to cut the same.

At this moment, when the bit 112d reaches an initially set position, i.e., a target position of the rough cutting, the cylinder controlling circuit (not shown in the figure) outputs a command effective to switch reversely the oil pressures of the cylinder chambers 119d and 119d' in the selecting cylinder 115d of the advanced tool slide member 111d to return the same.

Figure 17:
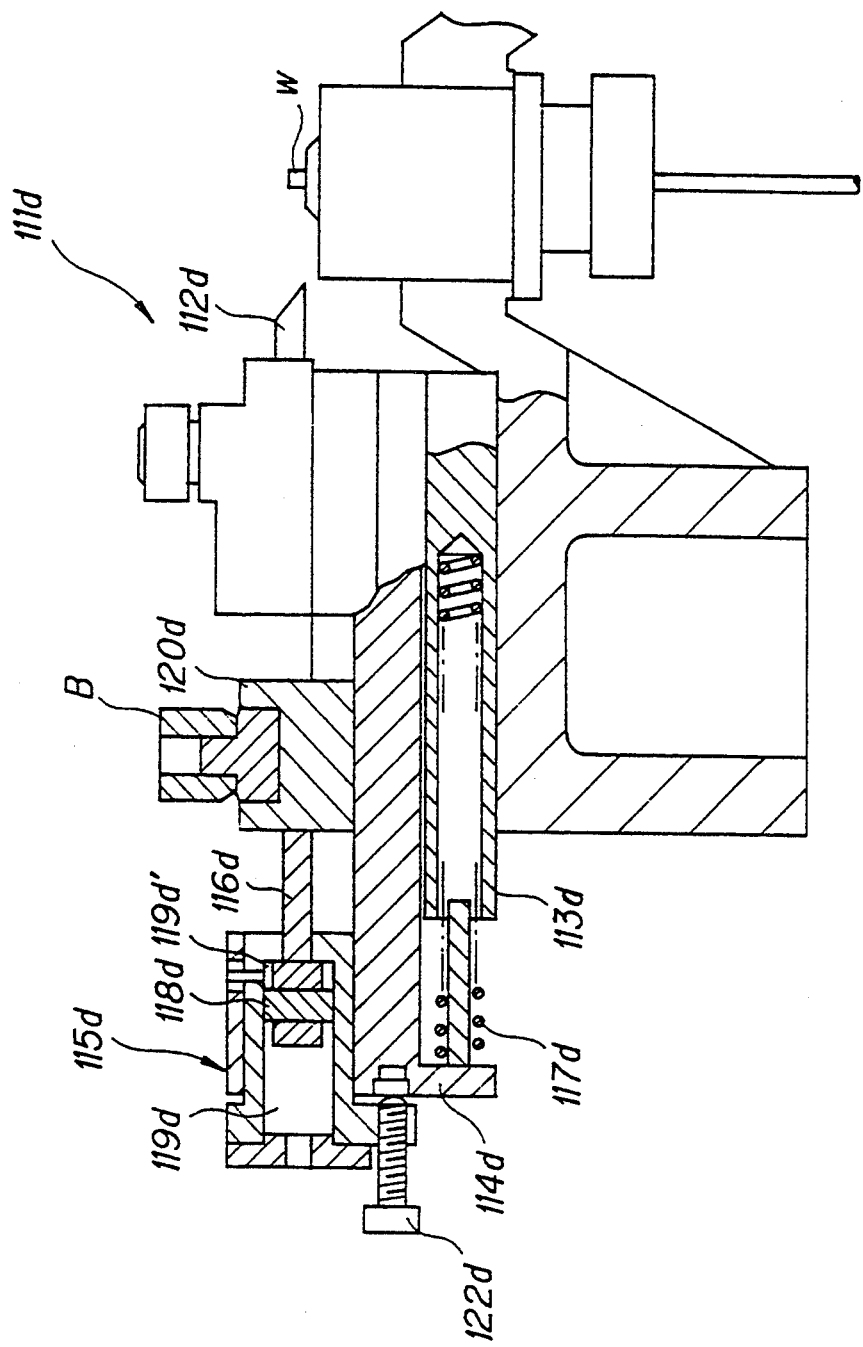
FIG. 17 is a partial sectional diagram showing a state where the FIG. 16 tool slide member is retracted by the selecting cylinder.
Figure 18:
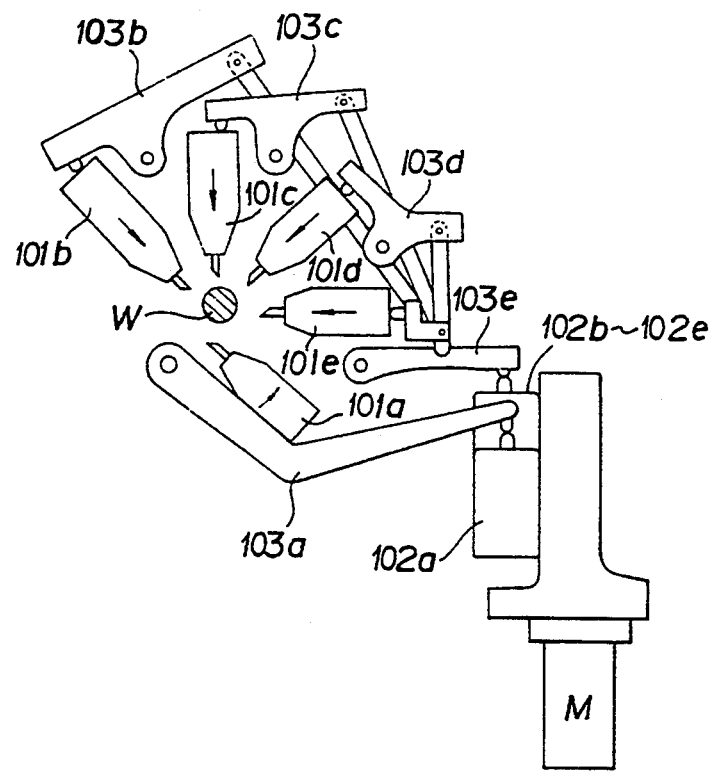
FIGS. 18 and 19 are side views of the conventional mechanisms for driving a plurality of tool slide members to effect cutting of a workpiece.
Figure 19:
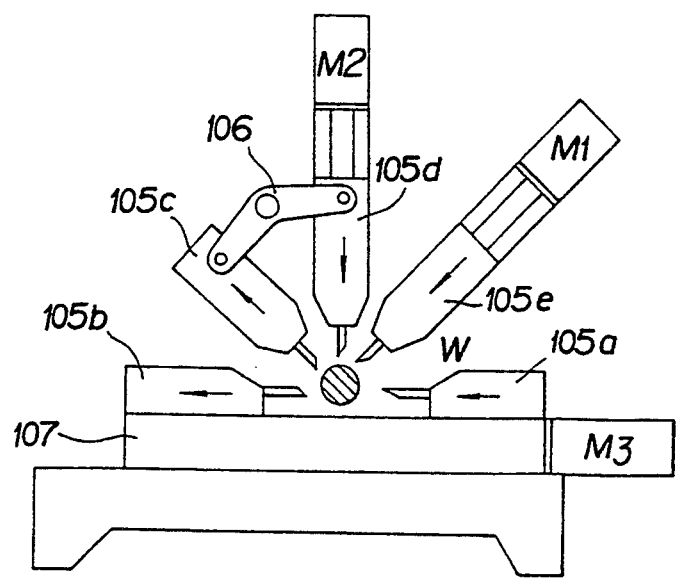

In this case, the piston 118d is fixed by the lever B through the rod 116d and the coupling 120d, while the selecting cylinder 115d is slideably disposed on the slider 114d which is normally urged by the elastic force of the spring 117d in the direction away from the workpiece ω. Therefore, the slider 114d is retracted relative to the lever B or coupling 120d so that the tool slide member 111d is entirely positioned away from the workpiece ω as shown in FIG. 17. Accordingly, the bit 112d is suspended from the cutting operation. After completion of the rough machining by the bit 112d, the bit 112b comes in contact with the workpiece to carry out finishing work by the predetermined finish amount.

Consequently according to this machining pattern, the single servo motor M2 is operated to effect sequential machining of preceding rough cutting and succeeding finishing work. Moreover, the pair of servo motors M1 and M2 are operated to place the three tool slide members 111a, 111b and 111d in contact with the workpiece ω to thereby effect concurrent machining of internal grinding, rough cutting and subsequent finishing work by means of the three bits 112a, 112b and 112d.

Alternatively, the servo motor M2 may be reversely rotated while the tool slide members 111c and 111e are set in similar manner as the tool slider members 111b and 111d, thereby effecting similar simultaneous cutting work by means of the bits 112a, 112c and 112e.

As described above, the five tool slide members are utilized in the embodiment; however, according to the invention, at least three tool slide members may be utilized and a pair of tool slide members are opposed to each other through a workpiece ω to construct various modifications other than the described embodiment.

Further, in this embodiment, one of the opposed tool slide members (111b) is coupled to the remaining tool slide members 111c–111e except the other of the opposed tool slide members (111a) through the link mechanism L such that adjacent tool slide members undergo displacements in opposite directions and every other one of the tool slide members undergoes displacement in the same direction. However, the present invention is not limited to such link mechanism, but generally a link mechanism may be provided to connect one of the opposed tool slide members to the remaining tool slide members except for the other of the opposed tool slide members such that adjacent tool slide members may undergo respective displacements in the same direction.

Still further, the two kinds of the machining patterns are described in conjunction with the above described embodiment. However, different machining patterns can be executed according to the invention. In addition, various types of bits can be attached to the tool slide members other than the particutar bits used in the above described embodiment.

As described above, according to the third aspect of the invention, at least a pair of tool slide members among a plurality of tool slide members are arranged in opposed relation to each other through an inbetween workpiece. The respective bits of the opposed tool slide members are displaced in directions toward the workpiece center. Further, the respective ones of the opposed tool slide members can be displaced independently from each other. By such construction, the bits of the pair of tool slide members can be placed in concurrent machining by the two bits such that respective machining resistances are applied reversely to each other to cancel with each other, thereby achieving perfectly balanced machining and improving cutting efficiency and cutting accuracy.

Further, one of the opposed tool slide members is driven by a first servo motor, and the other of the opposed tool slide members is driven by a second serve motor, thereby enabling the above mentioned prefect balance machining. In addition, when carrying out the perfectly balanced cutting operation, the pair of tool slide members can be displaced independently from each other to adjust an advancement amount to thereby further improve the cutting accuracy. Further in this invention, while the pair of tool slide members are set in a fixed position, their bits are driven back and forth in contact with a workpiece to carry out simultaneous machining such as rough cutting and finish working.

Moreover, among the tool slide members displaceable in the same direction through the link mechanism, one tool slide member is advanced relative to the remaining tool slide members by means of the adjusting means toward the workpiece center. Then, when the advanced tool slide member reaches a desired final position, the tool slide selecting means is operated to retract that tool slide member. By such construction, the simultaneous cutting operation can be effected by a single servo motor with using a plurality of bits driven in the same direction by means of the common link mechanism.

What is claimed is:

1. An NC complex automatic lathe having a main spindle receptive therein of a workpiece for chucking the same so as to protrude a front end portion of the workpiece, and a main spindle base for supporting the main spindle rotatably around a center axis of the workpiece and displaceably in a lengthwise direction of the workpiece, the lathe comprising:
   a turret tool slide disposed in the vicinity of a front end portion of the workpiece displaceably toward a center of the workpiece;
   a turret rotatably mounted on the turret tool slide to undergo displacement therewith;
   turret displacing means for displacing the turret tool slide transversely toward the center of the workpiece; and
   a plurality of tool slide members arranged around the front end portion of the workpiece radially with respect to the spindle axis in a free space away from a moving area of the turret tool slide so as to undergo displacements transversely toward the center of the workpiece, the tool slide members comprising servo motors for rotationally driving ball screws to effect displacement of the tool slide members.

2. An NC complex automatic lathe comprising:
   a main spindle including means receptive of a workpiece for chucking the same so as to protrude a front end portion thereof;
   a main spindle base supporting the main spindle for sliding movement along a center axis of the workpiece and including means for rotating the main spindle around its axis;
   a group of tool slide members disposed at one side of the workpiece front end portion and being arranged radially to undergo displacements radially toward the center axis of the workpiece;
   a multi-tool slide disposed at another side of the workpiece front end portion in opposed relation to the group of tool slide members;
   a multi-tool displacing means for displacing the multi-tool slide toward the workpiece center in a direction orthogonal to the axis of the main spindle;
   a back-main spindle including means for chucking the workpiece front end portion from a reverse direction relative to the main spindle; and
   a back-main spindle base supporting the back-main spindle for sliding movement along the center axis of the workpiece and in a direction perpendicular thereto.

3. An NC complex automatic lathe according to claim 2; further comprising numerical control means for controlling displacement of the multi-tool slide and the back-main spindle base.

4. An NC complex automatic lathe according to claim 2; wherein the multi-tool slide comprises a turret tool slide having a turret rotatably supported thereon.

5. An NC automatic lathe having a plurality of tool slide members carrying cutting tools and disposed around a workpiece and driven to undergo displacements so as to cut the workpiece, the NC automatic lathe comprising: means for mounting each tool slide member to enable its cutting tool to undergo displacement radially toward a center of the workpiece such that at least a pair of tool slide members are disposed at opposite sides with respect to the workpiece; and means for controlling the pair of opposed tool slide members to undergo, independently from each other and concurrently with each other, displacements toward the center of the workpiece to effect a balanced cutting during use.

6. An NC automatic lathe according to claim 5; including a first servo motor for driving one of the pair of opposed tool slide members, and a second servo motor for driving the other of the pair of opposed tool slide members.

7. An NC automatic lathe according to claim 5; including a link mechanism for coupling one of the opposed tool slide members to remaining tool slide members except for the other of the opposed tool slide members, regulating means for selectively regulating tool slide members displaceable in the same direction to precedingly advance one of the tool slide members toward the center of the workpiece independently from each other, and tool slide selecting means for retracting the tool slide member which was advanced by the regulating means after this tool slide member reached a given position.

8. A numerically controlled lathe comprising:
   a main spindle receptive of a workpiece having a center axis;
   a main spindle base having means mounting the main spindle for rotation about the center axis and for movement therealong;
   a turret tool slide having a turret rotatably supported thereon and being mounted at a front portion of the workpiece for displacement toward the center axis thereof;
   means for displacing the tool slide transversely toward the center axis of the workpiece; and
   a plurality of tool slide members arranged around the front portion of the workpiece radially with respect to each other and displaceable with the tool slide toward the center axis of the workpiece and being displaceable in pairs, one on either side of the workpiece in opposed relation to each other, to effect a balanced cutting of the workpiece.

9. A numerically controlled lathe comprising:

a main spindle receptive of a workpiece having a center axis;

a main spindle base having means mounting the main spindle for rotation about the center axis and for movement therealong;

a group of tool slide members mounted at a front portion of the workpiece for displacement toward the center axis thereof;

a multi-tool slide disposed opposite the tool slide members with respect to the workpiece;

means for displacing the multi-tool slide toward the center axis of the workpiece in a direction orthogonal to the center axis;

a back-main spindle for holding the front portion of the workpiece from a direction reverse to that of the main spindle; and a back-main spindle base having means mounting the back-main spindle for sliding movement along the center axis of the workpiece and in a direction orthogonal thereto.

10. The numerically controlled lathe according to claim 9; further comprising numerical control means for controlling displacement of the multi-tool slide and the back-main spindle base.

11. The numerically controlled lathe according to claim 9; wherein the multi-tool slide comprises a turret tool slide.

12. A numerically controlled lathe comprising:

a plurality of tool slide members disposed around a workpiece and carrying cutting tools for cutting the workpiece;

means mounting each tool slide member for displacement to radially displace the cutting tool carried thereby relative to the workpiece such that at least a pair of the tool slide members are disposed on opposite sides of the workpiece; and means for controlling the pair of opposed tool slide members to undergo concurrent displacement toward a center axis of the workpiece independently of each other and cooperatively to effect a balanced cutting of the workpiece.

13. A numerically controlled lathe according to claim 12; wherein the means for controlling comprises a first servo motor for one of the pair of opposed tool slide members and a second servo motor for the other of the pair of opposed tool slide members.

14. A numerically controlled lathe according to claim 12; wherein the means for controlling comprises a link mechanism for coupling one of the opposed tool slide members to remaining tool slide members except for the other of the opposed tool slide members, regulating means for selectively regulating displacement of the tool slide members in the same direction to advance one of the tool slide members toward the center axis of the workpiece independently from the others, and tool slide selecting means for retracting the tool slide member which was advanced by the regulating means after the tool slide member reaches a given position.

* * * * *